US012786973B2

(12) United States Patent
Nalla et al.

(10) Patent No.: US 12,786,973 B2
(45) Date of Patent: Nov. 3, 2026

(54) IMPROVING USER EXPERIENCE IN MULTI-FREQUENCY LAYER DEPLOYMENTS USING FREQUENCY BAND COMBINATION PRIORITY VALUE

(71) Applicant: Rakuten Symphony, Inc., Tokyo (JP)

(72) Inventors: Pradeep Kumar Nalla, Bangalore (IN); Sunil Kumar Tummalapenta, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 391 days.

(21) Appl. No.: 18/523,883

(22) Filed: Nov. 30, 2023

(65) Prior Publication Data

US 2025/0133549 A1 Apr. 24, 2025

(30) Foreign Application Priority Data

Oct. 18, 2023 (IN) ............................. 202341070932

(51) Int. Cl.
*H04W 72/0453* (2023.01)
*H04W 36/06* (2009.01)
(Continued)

(52) U.S. Cl.
CPC ....... *H04W 72/0453* (2013.01); *H04W 36/06* (2013.01); *H04W 36/08* (2013.01); *H04W 72/51* (2023.01); *H04W 72/563* (2023.01)

(58) Field of Classification Search
CPC . H04W 72/0453; H04W 36/06; H04W 36/08; H04W 72/51; H04W 72/563; H04W 8/24; H04W 52/146; H04W 52/34; H04W 72/21; H04W 72/23; H04W 72/0446; H04W 72/56; H04W 24/02; H04W 4/80; H04W 4/06; H04W 72/542; H04W 4/027; H04W 4/08; H04W 16/10; H04W 88/02; H04W 16/14; H04W 84/18; H04W 52/28; H04W 72/54; H04W 72/541; H04W 28/16; H04W 16/28; H04W 28/20; H04W 72/30; H04W 72/044; H04W 84/042; H04W 16/02; H04W 40/16; H04W 48/12;
(Continued)

(56) References Cited

U.S. PATENT DOCUMENTS

2017/0295574 A1* 10/2017 Stark ..................... H04W 72/56
2018/0034736 A1* 2/2018 Anchan ............... H04L 47/2433

(Continued)

*Primary Examiner* — Nimesh Patel
(74) *Attorney, Agent, or Firm* — HAUPTMAN HAM, LLP

(57) ABSTRACT

User Equipment (UE) band capabilities are received from a UE. A set of frequency band combinations are determined for the UE based on the UE band capabilities. Each frequency band combination of the set of frequency band combinations includes a group of frequency bands, and a frequency band combination priority value. Further, one or more frequency band combinations are identified from the set of frequency band combinations based on a current frequency band of the UE and the frequency band combination priority value. The UE is configured to perform frequency measurements for a plurality of frequency bands based on the one or more identified frequency band combinations. The UE is dynamically facilitated to latch to at least one frequency band based on the frequency measurements of the plurality of frequency bands.

18 Claims, 9 Drawing Sheets

(51) Int. Cl.
*H04W 36/08* (2009.01)
*H04W 72/51* (2023.01)
*H04W 72/563* (2023.01)

(58) Field of Classification Search
CPC ... H04W 72/543; H04W 12/76; H04W 16/00; H04W 28/26; H04W 40/12; H04W 72/25; H04W 72/04; H04W 72/40; H04W 72/535; H04W 74/00; H04W 80/00; H04W 24/10; H04W 4/021; H04W 28/0268; H04W 72/12; H04W 72/20; H04W 76/15; H04W 76/27; H04W 28/0236; H04W 36/22; H04W 48/10; H04W 56/0045; H04W 88/06; H04W 72/52; H04W 12/61; H04W 28/0215; H04W 28/0247; H04W 28/0284; H04W 28/06; H04W 28/0983; H04W 36/20; H04W 4/38; H04W 72/566; H04W 74/0808; Y02D 30/70; Y02D 10/00; H04L 5/0053; H04L 5/14; H04L 1/0026; H04L 1/1812; H04L 65/80; H04L 47/10; H04L 1/1854; H04L 47/805; H04L 5/0078; H04L 27/2646; H04L 5/023; H04L 67/61; H04L 41/0894; H04L 47/6215; H04L 47/24; H04L 65/752; H04L 1/20; H04L 27/2601; H04L 9/40; H04L 5/0023; H04L 63/105; H04L 5/0048; H04L 5/001; H04L 5/0094; H04L 25/0226; H04L 12/189; H04L 41/16; H04L 5/0064; H04L 43/16; H04L 25/0224; H04L 5/0007; H04L 5/0035; H04L 67/306; H04L 1/1887; H04L 47/762; H04L 47/801; H04L 5/0039; H04L 1/06; H04L 2012/5632; H04L 2209/80; H04L 25/0202; H04L 25/0222; H04L 25/0228; H04L 41/0896; H04L 47/20; H04L 47/2416; H04L 47/2433; H04L 47/6275; H04L 5/0016; H04L 5/006; G06N 20/00; G06N 3/042; G06N 3/045; G06N 20/20; G06N 7/01; G06N 3/02; G06N 3/044; G06N 3/047; G06N 3/049; G06N 3/088; G06N 3/09; G06N 3/126; G06N 3/0464; G06N 3/0475; G06N 3/092; G06N 3/096; G06N 5/022; G06N 5/04; H04B 7/0617; H04B 7/0626; H04B 7/06952; H04B 7/0639; H04B 7/088; H04B 7/0456; H04B 7/0413; H04B 7/0417; H04B 7/0452; H04B 7/0486; H04B 7/0691; H04B 7/0697; H04B 7/12; H04B 7/2621; H04B 7/2643; H04B 1/712; H04B 17/318
See application file for complete search history.

(56) References Cited

U.S. PATENT DOCUMENTS

| | | | | |
|---|---|---|---|---|
| 2018/0049073 | A1* | 2/2018 | Dinan ............... | H04W 36/0033 |
| 2024/0349354 | A1* | 10/2024 | Xu .................... | H04W 74/0833 |
| 2025/0081014 | A1* | 3/2025 | Metwaly Saad .. | H04W 36/0088 |

* cited by examiner

IMPROVING USER EXPERIENCE IN MULTI-FREQUENCY LAYER DEPLOYMENTS USING FREQUENCY BAND COMBINATION PRIORITY VALUE

RELATED APPLICATION

The present application claims priority based on Indian patent application Ser. No. 20/234,1070932, filed Oct. 18, 2023, the disclosures of which application is hereby incorporated by reference herein in its entirety.

BACKGROUND

The advent of 5G technology has transformed the way users interact with digital devices and services to bring faster speeds, reduced latency, and service improvements. The fundamental architecture that makes this deployment is complex and multi-layered communication network. The multi-layer networks intensify coverage and absorb traffic, boosting network competitiveness, and driving 5G evolution.

In matured 4G and 5G-Non-Standalone (NSA) deployments, mobile network operators have multiple frequency bands and carrier frequencies with different cell bandwidths. Typically, a spectral layer below 2 GHz is for coverage and extend the 5G mobile broadband coverage both to wide areas and to deep indoor environments. These lower frequencies have smaller cell bandwidth. The spectral layer spanning from 2 to 6 GHz is used for striking a compromise between capacity and coverage. However, compared to the range below 2 GHz, these bands suffer from a higher penetration loss and propagation attenuation. The spectral layer above 6 GHz is invoked for use-cases requiring high data rates but relaxed coverage. The higher frequencies have more cell band bandwidth and are preferred for performance. The challenge in such multi-layered deployments is to provide best service experience for User Equipment (UEs) considering its capabilities and network layout. Examples include providing higher downlink data rates, uplink data rates, better voice experience, conservation of UE battery, avoiding frequent handovers, etc. This in turn translates into ability to serve maximum number of UEs while meeting desired service experience. In view of the above discussion, there exists a has to improve user experience in multi layered deployment.

The information disclosed in this background is only for enhancement of understanding of the general background of embodiments described herein and is not to be taken as an acknowledgement or any form of suggestion that this information forms the prior art already known to a person skilled in the art.

BRIEF SUMMARY

In general, multi-layered networks of 5G have multiple frequency bands, multiple carriers, and different cell bandwidths. Such scenarios support only a coverage based handover and hence providing best service experience for UEs considering UE capabilities and network layout is a challenge. In other words, in response to multiple cells being overlayed with different frequency layers, achieving best user experience in multi-layered deployment is challenging.

In at least one embodiment, a system includes a memory storing computer-readable instructions, and a processor, connected to the memory, wherein the processor is configured to execute the computer-readable instructions to perform operations to receive one or more UE band capabilities from a UE. The processor is configured to determine a set of frequency band combinations for the UE based on the one or more UE band capabilities, wherein each frequency band combination of the set of frequency band combinations includes a group of frequency bands, and a frequency band combination priority value for the group of frequency bands. The processor is configured to identify one or more frequency band combinations from the set of frequency band combinations based on and a current frequency band of the UE and the frequency band combination priority value of each of the set of frequency band combinations. The processor is configured to configure the UE to perform frequency measurements for a plurality of frequency bands based on the one or more identified frequency band combinations. The processor is configured to dynamically facilitate latching of the UE to at least one frequency band of the plurality of frequency bands based on the frequency measurements of the plurality of frequency bands.

In at least one embodiment, a method includes receiving, by a processor, one or more UE band capabilities from a UE. The method further includes determining, by the processor, a set of frequency band combinations for the UE based on the one or more UE band capabilities, wherein each frequency band combination of the set of frequency band combinations comprises: a group of frequency bands, and a frequency band combination priority value for the group of frequency bands. The method includes identifying, by the processor, one or more frequency band combinations from the set of frequency band combinations based on a current frequency band of the UE, and the frequency band combination priority value of each of the set of frequency band combinations. The method includes configuring, by the processor, the UE to perform frequency measurements for a plurality of frequency bands based on the one or more identified frequency band combinations. The method includes dynamically facilitate, by the processor, latching of the UE to at least one frequency band of the plurality of frequency bands based on the frequency measurements of the plurality of frequency bands.

In at least one embodiment, a non-transitory computer-readable medium storing computer-readable instructions thereon, which when executed by a system causes the system to perform operations including receiving one or more UE band capabilities from a UE. The operations include determining a set of frequency band combinations for the UE based on the one or more UE band capabilities, wherein each frequency band combination of the set of frequency band combinations includes a group of frequency bands, and a frequency band combination priority value for the group of frequency bands. The operations include identifying one or more frequency band combinations from the set of frequency band combinations based on a current frequency band of the UE, and the frequency band combination priority value of each of the set of frequency band combinations. The operations include configuring the UE to perform frequency measurements for a plurality of frequency bands based on the one or more identified frequency band combinations. The operations include dynamically facilitate latching of the UE to at least one frequency band of the plurality of frequency bands based on the frequency measurements of the plurality of frequency bands.

The foregoing summary is illustrative only and is not intended to be in any way limiting. In addition to the illustrative aspects, at least one embodiment, and features described above, further aspects, embodiments, and features will become apparent by reference to the drawings and the following detailed description.

BRIEF DESCRIPTION OF THE DRAWINGS

The accompanying drawings, which are incorporated in and constitute a part of embodiments described herein, illustrate examples of embodiments and, together with the description, serve to explain the disclosed principles. The same numbers are used throughout the figures to reference like features and components. At least one embodiment of at least one of device and methods are now described, by way of example only, and with reference to the accompanying figures, in which.

Figure 1A:
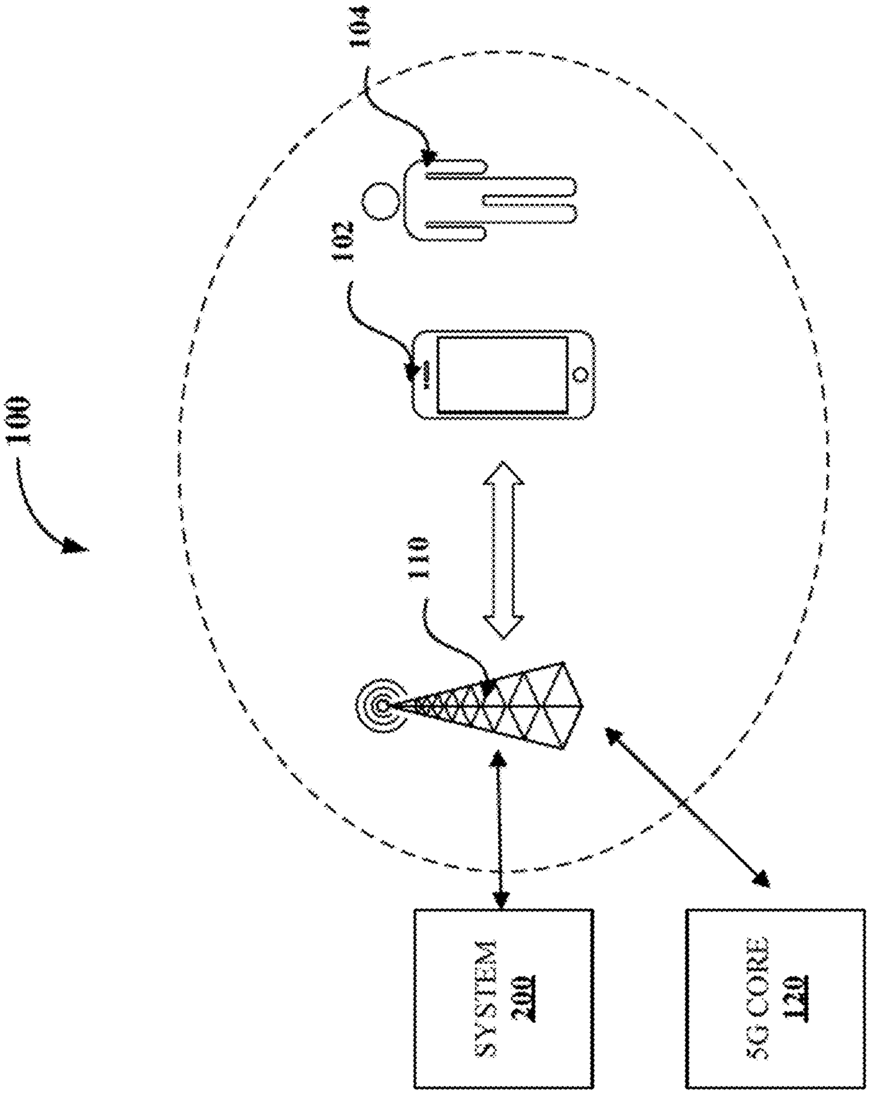
FIG. 1A illustrates a schematic architecture of a 5G communication system, where at least one embodiment is practiced.

Those skilled in the art understand that any block diagrams herein represent conceptual views of illustrative systems embodying the principles of the present subject matter. Similarly, any flow charts, flow diagrams, state transition diagrams, pseudo code, and the like represent various processes which are substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

Embodiments described herein are susceptible to various modifications and alternative forms, specific embodiment thereof have been shown by way of example in the drawings and will be described in detail below. However, the embodiments described herein are understood to not be limited to the particular forms disclosed, but on the contrary, embodiments described herein cover a plurality of modifications, equivalents, and alternative falling within the spirit and the scope of at least one embodiment.

The terms "comprises", "comprising", or any other variations thereof, are intended to cover a non-exclusive inclusion, such that a setup, device, or method that comprises a list of components or steps does not include only those components or steps but include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments, reference is made to the accompanying drawings that form a part hereof, and in which are shown by way of illustration specific embodiments that are capable of being practiced. These embodiments are described in sufficient detail to enable those skilled in the art to practice embodiments described herein, and that other embodiments are able to be utilized and changes are able to be made without departing from the scope of the embodiments described herein. The following description is, therefore, not to be taken in a limiting sense.

For convenience of explanation, embodiments are described herein using terms and names defined in the 3rd Generation Partnership Project Radio Access Network (3GPP RAN) standards. More specifically, the terms 'service-based architecture', 'frequency band combination', 'carrier aggregation', 'idle mode cell reselection', 'frequency measurements' 'RRCConnectionRelease message', 'secondary cell addition', 'secondary node addition', and 'handover' are to be interpreted as specified by the 3GPP RAN standards.

The term 'UE band capabilities" as used herein refers to UE capability information defined in 3GPP RAN standards. The UE band capabilities are sent as part of the UE capability information which is a RRC message. The UE band capabilities includes one or more details of the frequency bands that are supported by the UE. The UE capability information is not only sent during initial registration process but also is sent as part of reconfiguration.

FIG. 1A illustrates a schematic architecture 100 of a 5G communication system, where some embodiments are practiced. The architecture 100 uses a cloud-aligned service-based architecture (SBA) to support authentication, security, session management and aggregation of traffic from connected devices. Although embodiments are described herein with reference to 5G communication system, embodiments are also implemented with other communication technologies such as, fourth-generation (4G) wireless communication system with multi-frequency layer deployments. In general, the embodiments described herein are implemented with any communication technology deploying multi-frequency layers for coverage and connectivity.

The architecture 100 depicts a User Equipment 102 (hereinafter referred to as 'UE 102'). The UE 102 refers to any device used by a user 102 to access content such as, media content, textual content, gaming content, etc. Examples of the UE 102 include, but not limited to, any device used by the user 104 to communicate and access content such as, but not limited to, mobile phones, smartphones, laptops, wearables, Internet of Things (IoTs), and the like with 5G capabilities. As such, the UE 102 is configured to connect to data networks through which operator services, 3rd party services, and the like, providing the content requested by the user 104 is accessed by the UE 102. An example of the data network is the Internet.

The UE 102 is configured to connect over the base station 110 to the 5G core 120 which provides connectivity to the data network. In an embodiment, the base station 110 is a Radio Access Network (RAN) which is an Evolved Node B (eNodeB) or a Next-Generation Node B (gNodeB). Accordingly, the 5G core 120 includes a plurality of interconnected Network Functions which are defined by the 3GPP for delivering the control plane functionality and user plane functionality of the 5G communication system and are not depicted or described herein. In this example representation, the UE 102 is present in a cell 108 with multi-layered deployments as shown and described with reference to FIG. 1B.

Figure 1B:
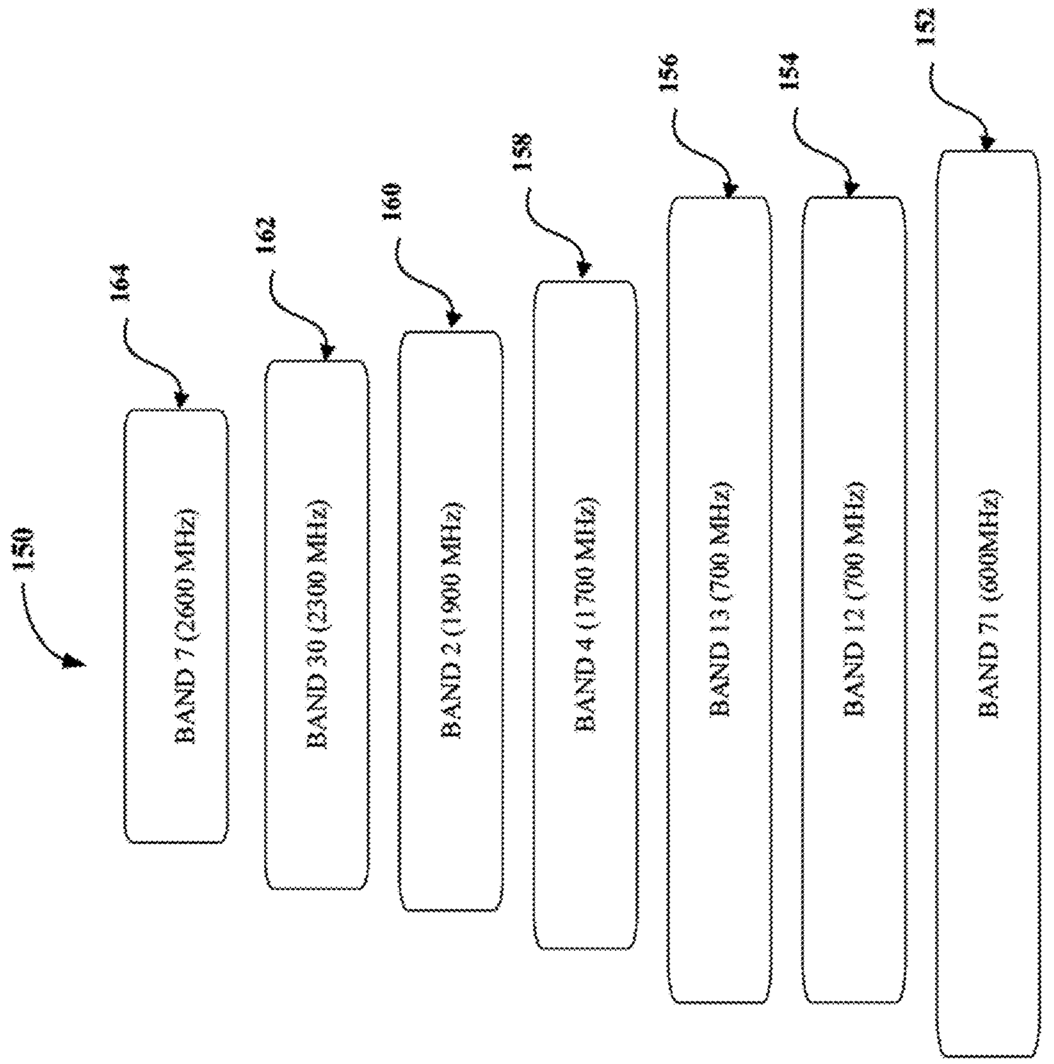
FIG. 1B illustrates a multi-layered deployment of the 5G communication system in which at least one embodiment is implemented.

Referring now to FIG. 1B, a multi-layered deployment 150 of the 5G communication system in which at least one embodiment is implemented. The multi-layered deployment includes multiple bands, multiple carriers, and different cell bandwidths. In this example representation, a plurality of frequency bands 152, 154, 156, 158, 160, 162, 164 are overlayed to provide coverage for the plurality of cells 112, 114, 116. Each of the plurality of frequency bands 152, 154, 156, 158, 160, 162, 164 are frequency layers also referred to as a carrier, has specific characteristics in terms of coverage (the range around the antenna where signals is still received) and capacity (bandwidth, data rates, throughput). For example, frequency band 152 is band 71 of 600 MHz, frequency band 154 is band 12 of 700 MHz, frequency band 156 is band 13 of 700 MHZ, frequency band 158 is band 4 of 1700 MHZ, frequency band 160 is band 2 of 1900 MHZ, frequency band 162 is band 30 of 2300 MHz, frequency band 164 is band 7 of 2600 MHz. In general, frequency bands in the higher frequency ranges (e.g., band 30 and band 7) typically provide greater capacity, while frequency bands in the lower range (e.g., band 71, band 12, band 13) provide wider or deeper coverage. The overlaying of frequency bands as depicted in FIG. 1B is provided as an example of at least one embodiment and Mobile Network Operators (MNOs) typically overlay distinct frequency allocations for different radio cells based on the geographical region or requirements of the geo-graphical region. As such, multi-layered deployment of the 5G communication system is performed by the Mobile Network operators in a plurality of ways other than those described herein for improving user experience, for example, improving throughput, bandwidth, better voice experience, multimedia experience, conservation of UE battery, avoiding frequent handovers, ultra-low latency, more reliability, massive network capacity, increased availability, etc.

In an example, the UE 102 is capable of supporting: (a) 2 Carrier Components (CC) for Carrier Aggregation (CA) and no E-UTRAN New Radio—Dual Connectivity (ENDC) in response to being latched onto band B13 (b) 2CC CA and ENDC in response to being latched onto band B2 and (c) 4CC CA and ENDC in response to being latched onto band B7. Such UE band capabilities are received from the UE 102 as part of the Radio Resource Control (RRC) message. In an example scenario, in response to the UE 102 latching onto frequency band 156 (i.e., band B13), the base station 110 configures 2CC CA for the UE 102 to get the highest data rate using B13. For example, the UE 102 performs CA of frequency band 158 (i.e., band 1700 MHz) and frequency band 156 (i.e., band 700 MHz). In other words, carrier aggregation is performed on carrier components of the frequency bands 156 and 158. Accordingly, the UE 102 simultaneously receives or transmits on one or multiple CCs depending on the UE capabilities. Carrier aggregation ensures providing higher throughput for services provided to the UE 102.

Conventionally, only a coverage based handover is supported for the UE 102 in multi-layer deployments. In an example scenario, the UE 102 is currently connected to frequency band 152 but will be capable of supporting the frequency bands 162 and 164. However, the UE 102 is only handed over to frequency bands 162 or 164 (i.e., band B2 or B7) only in response to entering the vicinity of frequency bands 162 or 164 to get higher data rates. In another example, in response to the coverage provided by the frequency band 152 being poor, then a handover from frequency band 152 to frequency band 162 or 164 is enabled. Although, the frequency bands 162 or 164 provide higher data rates and a better user experience in response to being compared to the frequency band 152, the coverage based handover of the UE 102 limits the user experience of the user 104 associated with the UE 102. In general, there is a requirement to improve the user experience for the user 104 associated with the UE 102 in a current cell, handover the UE 102 to a better target cell to further improve the user experience and improve the user experience by setting dedicated idle mode cell reselection priorities to make the UE 102 camp onto right cell for receiving a good service during next attach.

Various embodiments described herein disclose techniques to improve user experience in multi-frequency layer deployments. More specifically, the UE 102 dynamically latches to one or more frequency bands with higher frequency band priority values than the current cell based on a band combination priority table. The band combination priority table comprises a plurality of frequency band combinations and a set of frequency band combinations are selected from the band combination priority table for the UE 102 based on the one or more UE band capabilities. In at least one embodiment, one or more frequency band combinations from the set of frequency band combinations are identified based on a current frequency band of the UE 102, and a frequency band combination priority value of each of the set of frequency band combinations. Thereafter, the UE 102 is configured to perform frequency measurements for a plurality of frequency bands based on one or more identified frequency band combinations. The UE 102 latches to at least one frequency band of the plurality of frequency bands based on the frequency measurements. Such dynamic latching to one or more frequency bands with higher frequency band priority value ensures an improved user experience for the user 104 associated with the UE 102. The improved user experience results in higher downlink data rates and uplink data rates, better voice experience, multimedia experience, conservation of UE battery, avoiding frequent handovers, ultra-low latency, more reliability, massive network capacity, increased availability, etc. Moreover, while the UE 102 gets released, the base station 110 sets idle mode reselection priorities such that the UE 102 latches onto highest priority band in response to trying to attach next time. A system for improving the user experience in multi-frequency layer deployments is explained next with reference to FIG. 2.

Figure 2:
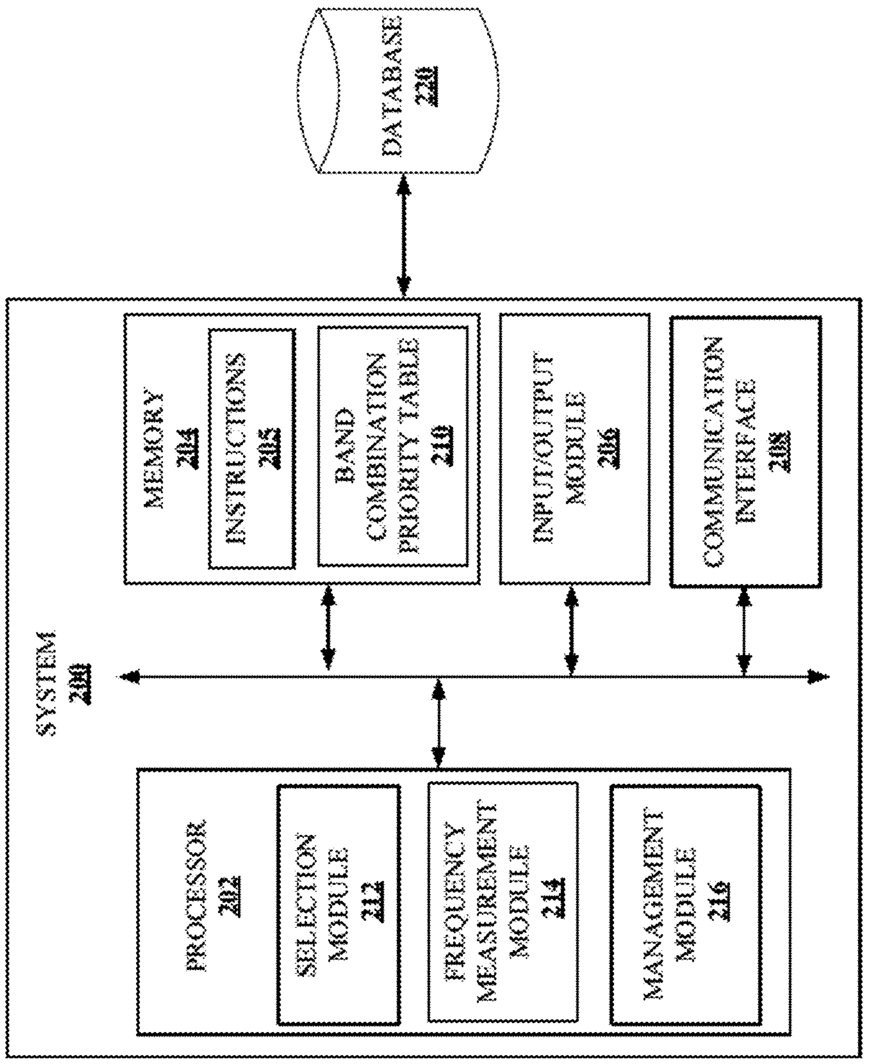
FIG. 2 illustrates a system for improving user experience in multi-frequency layer deployments, in accordance with at least one embodiment.

FIG. 2 illustrates a system 200 for improving user experience in multi-frequency layer deployments, in accordance with at least one embodiment. The term "user experience" as used herein refers to the user's 102 perception and response resulting from the access of any data content (e.g., media content) on the UE 102. More specifically, a plurality of aspects of an end-user interaction with digital content, for example, layout, visual design, text, brand, sound, and interaction relate to the user experience. In an example, in response to the user 102 accessing gaming content on the UE 102, then the quality of multimedia experience during a gaming session is referred to as the user experience. Some examples of improving user experience include, but not limited to, providing higher downlink data rates and uplink data rates, better voice experience, multimedia experience, conservation of UE battery, avoiding frequent handovers, ultra low latency, more reliability, massive network capacity, increased availability, etc. The embodiments described above for improving user experience are provided as examples and the user experience is able to be improved in different ways other than those described herein.

In at least one embodiment, the system 200 is embodied within a base station such as, the base station 110 shown in FIG. 1A. In at least one embodiment, the system 200 is communicably coupled to the base station 110 and is configured to perform the operations as described herein. Embodiments described herein have been explained herein with reference to the 5G communication system. However, a person skilled in the art understands that techniques adopted by the system 200 for improving user experience in multi-layer deployments are able to be applied to other communication systems, for example, communication system employing SBAs as will be explained herein. As such, the system 200 is a centralized or a distributed server configured to perform the one or more functions as described herein.

The system 200 is depicted to include a processor 202, a memory 204, an input/output module 206, and a communication interface 208. In at least one embodiment, the system 200 includes more or fewer components than those depicted herein. The various components of the system 200 are implemented using hardware, software, firmware or any combinations thereof. Further, the various components of the system 200 are operably coupled with each other. More specifically, various components of the system 200 are capable of communicating with each other using communication channel media (such as buses, interconnects, etc.). In at least one embodiment, the functions of the NRF 104 and the SMF 122 are embodied within the processor 202. The processor 202 is able to include fewer or more modules than those described herein.

In at least one embodiment, the processor 202 is embodied as a multi-core processor, a single core processor, or a combination of one or more multi-core processors and one or more single core processors. For example, the processor 202 is embodied as one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like. In at least one embodiment, the processor 202 includes a selection module 212, a frequency measurement module 214 and a management module 216.

In at least one embodiment, the memory 204 is capable of storing machine executable instructions, referred to herein as instructions 205. In at least one embodiment, the processor 202 is embodied as an executor of software instructions. As such, the processor 202 is capable of executing the instructions 205 stored in the memory 204 to perform one or more operations described herein.

The memory 204 is any type of storage accessible to the processor 202 to perform respective functionalities. For example, the memory 204 is able to include one or more volatile or non-volatile memories, or a combination thereof. For example, in at least one embodiment, the memory 204 is embodied as semiconductor memories, such as flash memory, mask ROM, PROM (programmable ROM), EPROM (erasable PROM), RAM (random access memory), etc. and the like.

In at least one embodiment, the memory 204 stores a band combination priority table 210 (see, Table 1 shown below). The band combination priority table 210 includes a plurality of frequency band combinations. Each frequency band combination includes a group of frequency bands. In an example, band combination CA_1A-3A-7A indicates a band combination of frequency band 1A, frequency band 3A and frequency band 7A. In general, the frequency band combinations are at least one of carrier aggregation frequency band combinations and ENDC frequency band combinations which are intra-band contiguous, intra-band non-contiguous, and inter-band (two bands, three bands, four bands, five bands). As such, the plurality of frequency band combinations in the band at combination priority table 210 are defined by a mobile network operator to combine capabilities of radio cells at distinct frequency allocations to enhance the end user experience. Such techniques of aggregating multiple channels together increase the total available bandwidth of a single transmission, and thereby increase the bitrate and capacity of the network. In general, the band combination priority table 210 gives flexibility to the mobile network operator to configure band combination priorities as per their deployment strategies resulting in improvement of overall user experience for UEs. The band combination priority table 210 also includes a frequency band combination priority value for each of the plurality of frequency band combinations and a frequency band priority value for each frequency band within a frequency band combination. In at least one embodiment, the frequency band combination priority value for each of the plurality of frequency band combinations and a frequency band priority value for each frequency band in the frequency band combination are determined based on throughput, and bandwidth. An example of the band combination priority table 210 is shown below in Table 1.

TABLE 1

| Band combination | Frequency band combination priority value | Frequency band priority value |
|---|---|---|
| CA_1A-3A-7A | 4 | 3, 1, 2 |
| CA_1A-3A-8A | 5 | 2, 1, 3 |
| CA_1A-3A-20A | 8 | 2, 1, 3 |
| CA_1A-3A-8A-20A | 3 | 2, 1, 3, 4 |
| CA_1A-3A-7A-28A | 7 | 3, 1, 2, 4 |
| DC_3A-7A-7A_n78A | 1 | 1, 2, 3, 4 |
| DC_7A-7A_n78A | 2 | 1, 2, 3 |
| CA_3A-7A-7A | 6 | 1, 2, 3 |

As is seen from Table 1, the band combination priority table 210 includes a plurality of frequency band combinations. The frequency band combinations ensure increased bandwidth and better throughput for UEs such as, the UE 102 and are specified in TS 38.101-3. In an example, CA_1A-3A-7A is a frequency band combination in which frequency bands 1A, 3A and 7A are aggregated. In another example, DC_7A-7A_n78A is a frequency band combination for interworking between radio networks (here 4G and 5G) in which dual connectivity is performed between frequency bands 7A and n78A. Further, each of these frequency band combinations in the band combination priority table 210 have a frequency band combination priority value. In the band combination priority table 210, band combination of DC_3A-7A-7A_n78A has band combination priority value of '1' which signifies the highest priority to this band combination. The band combination of CA_1A-3A-20A has a band combination priority value of '8' which is the least band combination priority value for a frequency band combination. Further, each frequency band in the frequency band combination is also assigned a priority among the group of frequency bands. In an example, the frequency band combination of CA_1A-3A-8A includes the frequency bands 1A, 3A and 8A and each frequency band supports a different carrier component. As such, the frequency band combination (i.e., CA_1A-3A-8A) has a frequency band combination priority value of 5 and each of the frequency bands, namely frequency band 1A has a frequency band priority value of '2', frequency band 3A has a frequency band priority value of '1' and frequency band 8A has a frequency band priority value of '3'. Accordingly, the frequency band combination has a priority value which is different from a priority value of individual frequency bands of the group of frequency bands in the corresponding frequency band combination. A frequency band priority value of a frequency band in a frequency band combination will be different from a frequency band priority value of the frequency band in another frequency band combination. For example, the frequency band 1A in the band combination of CA_1A-3A-7A has a frequency band priority value of '3' and the frequency band 1A in the band combination of CA_1A-3A-8A has a frequency band priority value of '2'. As such, the frequency band priority values are priority values between frequency bands in a frequency band combination and are able to vary for different frequency band combinations.

The frequency band combination priority values and the frequency band priority values depicted in the Table 1 are provided as examples exemplary and each mobile network operator is able to define the frequency band combinations, the frequency band combination priority values and the frequency band priority values in different ways based on one or more factors such as, but not limited to, bandwidth, throughput, and the like. In general, the band combination priority table 210 is customized by the mobile network operators to ensure improved user experience is provided to the users in multi-layer deployments.

In at least one embodiment, the processor 202 is configured to execute the instructions 205 to: (1) receive one or more UE band capabilities from the UE 102, (2) determine a set of frequency band combinations for the UE 102 based on the one or more UE band capabilities, (3) identify one or more frequency band combinations from the set of frequency band combinations based on a current frequency band of the UE 102 and the frequency band combination priority value, (4) identify the at least one frequency band from the plurality of frequency bands based on a frequency band priority value associated with each of the plurality of frequency bands, (5) configure the UE 102 to perform at least one of: a carrier aggregation measurement and E-UTRAN New Radio—Dual Connectivity (ENDC) measurement, (6) receive frequency measurement of the at least one frequency band from the UE 102, (7) facilitate the UE 102 to perform one of: a secondary cell addition, and a secondary node addition, of the at least one frequency band with the current frequency band, (8) identify the at least one frequency band from the plurality of frequency bands with a higher frequency band priority value with respect to the current frequency band, (9) configure the UE 102 to perform handover measurements for the at least one frequency band, (10) receive frequency measurement of the at least one frequency band, (11) perform a handover of the UE from the current frequency band to the at least one frequency band, (12) configure the UE 102 to perform frequency measurements for a plurality of frequency bands, (13) dynamically facilitate latching of the UE to at least one frequency band of the plurality of frequency bands based on the frequency measurements of the plurality of frequency bands. The processor 202 is further configured to: (1) determine one or more frequency bands from the plurality of frequency bands based on a frequency band priority value associated with each of the plurality of frequency bands, (2) generate an idle mode cell reselection priority information comprising the one or more frequency bands and corresponding frequency band priority values, and (3) send the one or more idle mode cell reselection priority information to the UE 102 prior to release from the current frequency band.

In at least one embodiment, the I/O module 206 includes mechanisms configured to receive inputs from and provide outputs to an operator of the system 200 (not shown in FIGS). The term 'operator of the system 200' as used herein refers to one or more individuals, for example, operators or service providers, whether directly or indirectly, associated with managing the base station 110 or the 5G communication system. In an example, the operator of the system 200 provides the band combination priority table 210 via the I/O module 206. In another example, the frequency measurements of the UE 102 and the one or more frequency bands the UE 102 is latched to will be displayed on the output interface of the I/O module 206. To enable reception of inputs and provide outputs to the system 200, the I/O module 206 includes at least one input interface and at least one output interface. Examples of the input interface include, but are not limited to, a keyboard, a mouse, a joystick, a keypad, a touch screen, soft keys, a microphone, and the like. Examples of the output interface include, but are not limited to, a display such as a light emitting diode display, a thin-film transistor (TFT) display, a liquid crystal display, an active-matrix organic light-emitting diode (AMOLED) display, a microphone, a speaker, a ringer, and the like.

In at least one embodiment, the communication interface 208 includes mechanisms configured to communicate with other entities in the 5G communication system such as, the UE 102, the 5G core 120 or the base station 110. In at least one embodiment, in response to the system 200 being embodied within the base station 110, then the communication interface 208 receives inputs from the entities mentioned hereinbefore. As such, the communication interface 208 is a Uu interface for the UE 102 communicating with the system 200 and/or the communication interface 208 is a NG interface for the SYSTEM 200 communicating with the 5G core 120. Alternatively, in response to the system 200 being communicably coupled to the base station 110, then the system 200 receives the inputs from the base station 110 via the communication interface 208.

In at least one embodiment, the communication interface 208 receives one or more UE band capabilities from the UE 102. The one or more UE band capabilities include information related to the frequency bands supported by the UE 102. The UE 102 sends the one or more UE band capabilities in an RRC message to the system 200 during initial registration process. In other words, the UE 102 sends information related to the UE capabilities to the system 200 during registration in response to an enquiry from the base station 110. The RRC message is sent as part of the RRC setup in which the UE 102 connects with the base station 110. Further, the RRC message includes information other than the one or more UE band capabilities specified hereinbefore and are not explained herein. In at least one embodiment, the communication interface 208 receives frequency measurement of at least one frequency band from the UE 102. The UE 102 is configured to perform at least one of: a carrier aggregation measurement, an E-UTRAN New Radio—Dual Connectivity (ENDC) measurement and a handover measurement for a plurality of frequency bands as will be explained hereinafter. The system 200 is configured to receive the frequency measurements via the communication interface 208 from the UEs connected to the base station 110, for example, the UE 102. The processing of the one or more UE band capabilities to dynamically facilitate latching of the UE 102 to at least one frequency band for improving user experience in a current cell is explained with reference to FIGS. 3A-3C and performing a handover is explained with reference to FIG. 4A-4B.

The system 200 is depicted to be in operative communication with a database 220. In at least one embodiment, the database 220 is configured to store one or more policies for identifying the set of frequency band combinations (also referred to herein interchangeably as 'user experience profile') for each UE such as, the UE 102. More specifically, the one or more UE capabilities from the UE 102 are used to identify the set of frequency band combinations based on the one or more policies. In one example, a policy indicates identifying the set of frequency band combinations based on the frequency bands supported by the UE 102 and the current cell of the UE 102. In another example, a policy specifies selecting the set of frequency band combinations based on the one or more UE band capabilities and a probable mobility of the UE 102. The policies described herein are provided as examples and the mobile network operator is able to define any such policy to ensure the set of frequency band combinations selected for the UE 102 enrich user experience for the user 102. Further, the database 220 stores a plurality of use experience profiles for a plurality of UEs connected to the base station 110. Each of these use experience profiles include a set of frequency band combinations which were identified based on UE band capabilities provided by respective UEs. In addition, the use experience profiles also include the frequency band combination priority value for each of the frequency band combinations in the use experience profile and the frequency band priority value for each frequency band of the group of frequency bands in each frequency band combination. In at least one embodiment, the database 220 also stores frequency measurements received from the UEs. These frequency measurements are stored for performing carrier aggregation of frequency bands, dual connectivity of the frequency bands and handover of the UE 102 from one frequency band to another frequency band in multi-layer deployment to enhance the user experience as will be explained in detail hereafter.

The database 220 includes multiple storage units such as hard disks and/or solid-state disks in a redundant array of inexpensive disks (RAID) configuration. In at least one embodiment, the database 220 includes a storage area network (SAN) and/or a network attached storage (NAS) system. In at least one embodiment, the database 220 corresponds to a distributed storage system, wherein individual databases are configured to store custom information, such as, historical data related to use experience profiles, frequency measurements received from UEs, idle mode cell reselection priority information for each UE, historical throughput and bandwidth achieved, current frequency band/frequency band combinations each UE is latched to, etc.

In at least one embodiment, the database 220 is integrated within the system 200. For example, the system 200 includes one or more hard disk drives as the database 220. In at least one embodiment, the database 220 is external to the system 200 and is accessed by the system 200 using a storage interface (not shown in FIG. 2). The storage interface is any component capable of providing the processor 202 with access to the database 220. The storage interface includes, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the database 220.

As already explained, the communication interface 208 is configured to receive the one or more UE band capabilities from the UE 102 during the RRC setup. In an example, the UE band capabilities received from the UE 102 indicate that the UE 102 supports frequency bands B1, B3, B7, B8, n78. The communication interface 208 is configured to forward the one or more UE band capabilities to the processor 202. The processor 202 in conjunction with the instructions 205 stored in the memory 204 is configured to process the one or more UE band capabilities and perform one or more functions as will be described herein.

The selection module 212 of the processor 202 in conjunction with the instructions 205 stored in the memory 204 is configured to determine a set of frequency band combinations ($C1, C_2, \ldots, C_m$) for the UE 102 based on the one or more UE band capabilities. These set of frequency band combinations ($C1, C_2, \ldots, C_m$) are identified from a plurality of frequency band combinations ($C1, C_2, \ldots, C_n$) in the band combination priority table 210. More specifically, only frequency band combinations which include frequency bands supported by the UE 102 are selected. In an example, only frequency band combinations that include frequency bands B1, B3, B7, B8, n78 supported by the UE 102 are selected as the set of frequency band combinations ($C_1, C_2, \ldots, C_m$). As already explained, each frequency band combination of the set of frequency band combinations ($C_1, C_2, \ldots, C_m$) comprises a group of frequency bands (e.g., $B_{11}, B_{21}, \ldots, B_{n1} \in C_1$), a frequency band combination priority value for the group of frequency bands. An example of the set of frequency band combinations ($C_1, C_2, \ldots, C_m$) selected based on the one or more UE band capabilities is shown below in Table 2.

TABLE 2

| Band combination | Frequency band combination priority value | Frequency band priority value |
|---|---|---|
| CA_1A-3A-7A | 4 | 3, 1, 2 |
| CA_1A-3A-8A | 5 | 2, 1, 3 |
| DC_3A-7A-7A_n78A | 1 | 1, 2, 3, 4 |
| DC_7A-7A_n78A | 2 | 1, 2, 3 |
| CA_3A-7A-7A | 6 | 1, 2, 3 |

As shown on Table 2, the set of frequency band combinations ($C_1, C_2, \ldots, C_5$) that is supported by the UE 102 are identified (i.e., $C_1$=CA_1A-3A-7A, $C_2$=CA_1A-3A-8A, $C_3$=DC_3A-7A-7A_n78A, $C_4$=DC_7A-7A_n78A, $C_5$-CA_3A-7A-7A). In at least one embodiment, the selection module 212 is configured to identify one or more frequency band combinations from the set of frequency band combinations ($C_1, C_2, \ldots, C_5$) based on a current frequency band $C_b$ of the UE 102 and the frequency band combination priority value of each of the set of frequency band combinations ($C_1, C_2, \ldots, C_5$). In general, frequency band combinations including the current frequency band $C_b$ and which have a higher frequency band combination priority value among the set of frequency band combinations are identified as the one or more frequency band combinations. In an example, in response to the UE 102 being connected to frequency band 1A, then the one or more identified frequency band combinations are ($C_1, C_2, C_3, C_4$) which are the likely band combinations which the UE 102 latches onto for achieving a better user experience. As such, each of the one or more frequency band combinations include a group of frequency bands (i.e., $B_{11}$, $B_{21}$, . . . , $B_{n1} \in C_1$) and the groups of frequency bands of the one or more frequency band combinations (i.e., $B_{11}$, $B_{21}$, . . . , $B_{n1} \in C_1$; $B_{12}$, $B_{22}$, . . . , $B_{n2} \in C_2$; $B_{13}$, $B_{23}$, . . . , $B_{n3} \in C_3$; $B_{14}$, $B_{24}$, . . . , $B_{n4} \in C_4$) are collectively referred to as 'a plurality of frequency bands' hereafter. The Table 2 is also stored in the memory 204.

In at least one embodiment, each of the one or more identified frequency band combinations have at least one frequency band with a higher frequency band priority value than the current frequency band. In an example, the UE 102 is latched on to frequency band 1A, and hence the one or more identified frequency band combinations $C_1$=CA_1A-3A-7A, $C_2$=CA_1A-3A-8A, $C_3$=DC_3A-7A-7A_n78A) either have frequency band combinations that are supported based on the current frequency band frequency band combination priority value which are higher and at least one frequency band in each of these frequency band combinations have a higher frequency band priority value than the current frequency band. As such, the UE 102 dynamically adapts latching onto one or more frequency bands to either move to the band combination with highest band combination priority value (i.e., DC_3A-7A-7A_n78A) or the frequency band in the frequency band combination with highest frequency band priority value (i.e., band 3A).

In at least one embodiment, the frequency measurement module 214 in conjunction with the instructions 205 stored in the memory 204 is configured to configure the UE 102 to perform frequency measurements for the plurality of frequency bands based on the one or more identified frequency band combinations. More specifically, the frequency measurement module 214 configures the UE 102 to perform at least one of: a carrier aggregation measurement and E-UTRAN New Radio—Dual Connectivity (ENDC) measurement for each frequency band of the plurality of frequency bands. In an example, the frequency measurement module 214 of the processor 202 configures the UE 102 perform CA measurements for frequency bands 3A, 7A and ENDC measurements for frequency band n78A. In at least one embodiment, the frequency measurement module 214 configures the UE 102 to perform handover measurements for the at least one frequency band. To that effect, the frequency measurement module 214 is configured to identify at least one frequency band from the plurality of frequency bands based on a frequency band priority value associated with each of the plurality of frequency bands. The plurality of frequency bands are associated with the one or more identified frequency band combinations. More specifically, the at least one frequency band from the plurality of frequency bands with a higher frequency band priority value with respect to the current frequency band is identified based on the frequency band combination priority value associated with each of the one or more identified frequency band combinations and a frequency band priority value associated with each frequency band of the plurality of frequency bands. More specifically, the one or more identified frequency band combinations are analyzed to identify frequency band combinations with higher frequency band priority value, for example, frequency band combinations ($C_1$=CA_1A-3A-7A, $C_2$=CA_1A-3A-8A, $C_3$=DC_3A-7A-7A_n78A, C4=DC_7A-7A_n78A) and as next steps at least one frequency band with highest frequency band priority value in the plurality of frequency bands. The plurality of frequency bands are associated with the one or more identified frequency band combinations. In an example, the frequency measurement module 214 identifies frequency band combination $C_3$=DC_3A-7A-7A_n78A as the frequency band combination with highest frequency band combination priority value among the one or more identified frequency band combinations and frequency band 8A as the frequency band with highest frequency band priority value of '1' in the plurality of frequency band combinations. As such, the frequency measurement module 214 configures the UE 102 to perform handover measurement to the frequency band 3A with highest frequency band priority value. The UE 102 performs frequency measurements for the frequency bands 3A, 7A and n78A. The UE 102 performs frequency measurements and sends frequency reports as described in 3GPP standard.

In at least one embodiment, the frequency measurement module 214 receives frequency measurement of the at least one frequency band from the UE 102 via the communication interface 208. The frequency measurement module 214 is configured to send the frequency measurements to the management module 216. In an example, in response to the frequency measurement module 214 receiving frequency measurements from the UE 102, for example, CA measurements of frequency band 8A, then the frequency measurement module 214 sends the frequency measurement to the management module 216.

The management module 216 in conjunction with the instructions 205 stored in the memory 204 is configured to dynamically facilitate latching of the UE 102 to at least one frequency band of the plurality of frequency bands ($B_{11}$, $B_{21}$, . . . , $B_{n1}$; $B_{12}$, $B_{22}$, . . . , $B_{n2}$; $B_{13}$, $B_{23}$, . . . , $B_{n3}$; $B_{14}$, $B_{24}$, . . . , $B_{n4}$) based on the frequency measurements of the plurality of frequency bands ($B_{11}$, $B_{21}$, . . . , $B_{n1}$; $B_{12}$, $B_{22}$, . . . , $B_{n2}$; $B_{13}$, $B_{23}$, . . . , $B_{n3}$; $B_{14}$, $B_{24}$, . . . , $B_{n4}$). In at least one embodiment, the management module 216 is configured to facilitate the UE 102 to perform one of: a secondary cell addition, and a secondary node addition, of the at least one frequency band with the current frequency band $C_b$. A secondary cell addition is performed in response to CA measurements being received from the UE 102 and secondary node addition being performed in response to ENDC measurements being received from the UE 102. As such, in response to the management module 216 receiving the frequency measurement of the frequency band 8A, the management module 216 performs carrier aggregation of the frequency band 8A and thereby performing a secondary cell addition to the current frequency band $C_b$. Accordingly, the carrier aggregation results in a band combination of 1A-8A which provides improved user experience by enhancing throughput rates. However, the improving user experience by adaptively latching to one or more frequency bands is an iterative procedure till the UE 102 reaches the frequency band combination with highest frequency band combination priority value or the frequency band with higher frequency band priority value than the current frequency band. In this example representation, as the frequency band combination of 1A-8A is not the frequency band combination with highest frequency band combination priority value, the frequency measurement module 214 continues to performs frequency measurements for the other frequency bands. In other words, the UE 102 continues to perform frequency measurements for the frequency bands B3, B7 and sends frequency measurements to the frequency measurement module 214.

In an example, in response to the frequency measurement module 214 receiving CA measurement report from the UE 102 for frequency band 3A, then the frequency measurement module 214 facilitates the UE 102 to perform carrier aggregation of the frequency band 3A as a secondary cell along with the frequency band 1A. Therefore, the carrier aggregation results in the frequency band combination of 1A-3A-8A for the UE 102 providing improved bandwidth, throughput which enhances the user experience for the user 104 of the UE 102. Although, the aggregation of frequency bands results in an improved user experience, the band combination achieved by the carrier aggregation is not the frequency band combination with highest frequency band combination priority value which provides the best user experience. In general, the frequency measurements are performed till the UE 102 reaches the frequency band combination with highest frequency band combination priority value or a handover to the frequency band with highest frequency band priority value in the frequency band combination.

As such, the frequency band combination comprising the group of frequency bands 1A-3A-8A has a frequency band combination priority value of '5' and as there is a possibility to improve the user experience of the UE 102, the frequency measurement module 214 continues to receive frequency measurements. For example, the UE 102 continues to perform CA measurements for band 7A, ENDC measurements for band n78A and handover measurements for 3A. In an example, the frequency measurement module 214 receives CA measurement of frequency band 7A from the UE 102. The frequency measurement module 214 sends the CA measurement to the management module 216.

The management module 216 in conjunction with the instructions 205 in the memory 204 is configured to dynamically adapt the latching of the UE 102. More specifically, the management module analyzes the current frequency band combination, frequency measurement received and frequency band combination priority values, frequency band priority value to determine the addition or deletion of a secondary cell/secondary node based on the one or more policies. In this example, in response to the management module 216 receiving the frequency measurement of the frequency band 7A, then the management module 216 releases the secondary cell 8A and adds frequency band 7A as the secondary cell along with the frequency bands 1A-3A-8A as the frequency band combination of 1A-3A-8A has a lower frequency band combination priority value '5' in response to being compared with the frequency band combination of 1A-3A-7A with a frequency band combination priority value of '4'. As seen from the Table 2, the set of frequency band combinations is based on the one or more UE band capabilities of the UE 102, and the frequency band combination of 1A-3A-7A is the frequency band combination with highest band combination priority value in the current cell. However, the UE 102 continues to perform handover measurement for the frequency band 3A which has the highest frequent band priority value in the frequency band combination with the highest frequency band combination priority value of '1'. In an example, in response to the frequency measurement module 214 receiving the handover measurement for frequency band 3A, then the management module 216 performs a handover of the UE 102 from the current frequency band $C_b$ to the at least one frequency band (i.e., the frequency band 3A).

The sequence of receiving frequency measurements from the UE 102 described herein are provided as examples and the frequency measurements are received in a sequence different from that described herein. Accordingly, the dynamic latching of the UE 102 to the at least one frequency band will vary to achieve an improved user experience. In an example, in response to the handover measurement being received from band 3A in the first instance, then the UE 102 does not perform carrier aggregation as explained herein-above but is rather handed over to the frequency band 3A which provides an enhanced user experience for the UE 102.

In at least one embodiment, the selection module 212 in conjunction with the instructions 205 stored in the memory 204 is configured to determine one or more frequency bands from the plurality of frequency bands based on a frequency band priority value associated with each of the plurality of frequency bands. More specifically, frequency bands from frequency band combinations with high frequency band combination priority value and high frequency band priority value compared with a current frequency band are identified. In an example, the UE 102 is attached to a frequency band 1A, as such the plurality of frequency bands are 3A, 7A, n78A, which are from frequency band combinations with high frequency band combination priority table and individually have high frequency band priority value. In at least one embodiment, the selection module 212 is further configured to generate an idle mode cell reselection priority information including the one or more frequency bands and corresponding frequency band priority values. The idle mode cell reselection priority information is an information element in the RRCConnectionRelease message defined by TS 36.331 of 3GPP standards. In an example, the one or more idle mode cell reselection priority information includes information of the plurality of frequency bands 3A, 7A, n78A and corresponding frequency band priority values, for example, frequency band priority value of '1', '2' and '3' for the frequency bands 3A, 7A, n78A, respectively. The idle mode cell reselection priority information improves the user experience by setting dedicated idle mode cell reselection priorities to ensure the UE 102 camps onto right cell which provides a good user experience during next attach. In at least one embodiment, the one or more idle mode cell reselection priority information is sent to the UE 102 prior to release from the current frequency band $C_b$. In other words, the release of an RRC connection is initiated by the RRCConnectionRelease message. The RRCConnectionRelease message includes other information elements other than the plurality of frequency bands and corresponding frequency band priority values as defined by TS 36.331 of 3GPP standards and are not described herein. A method for improving user experience in a current cell will be explained next with reference to FIGS. 3A-3C.

Figure 3A:
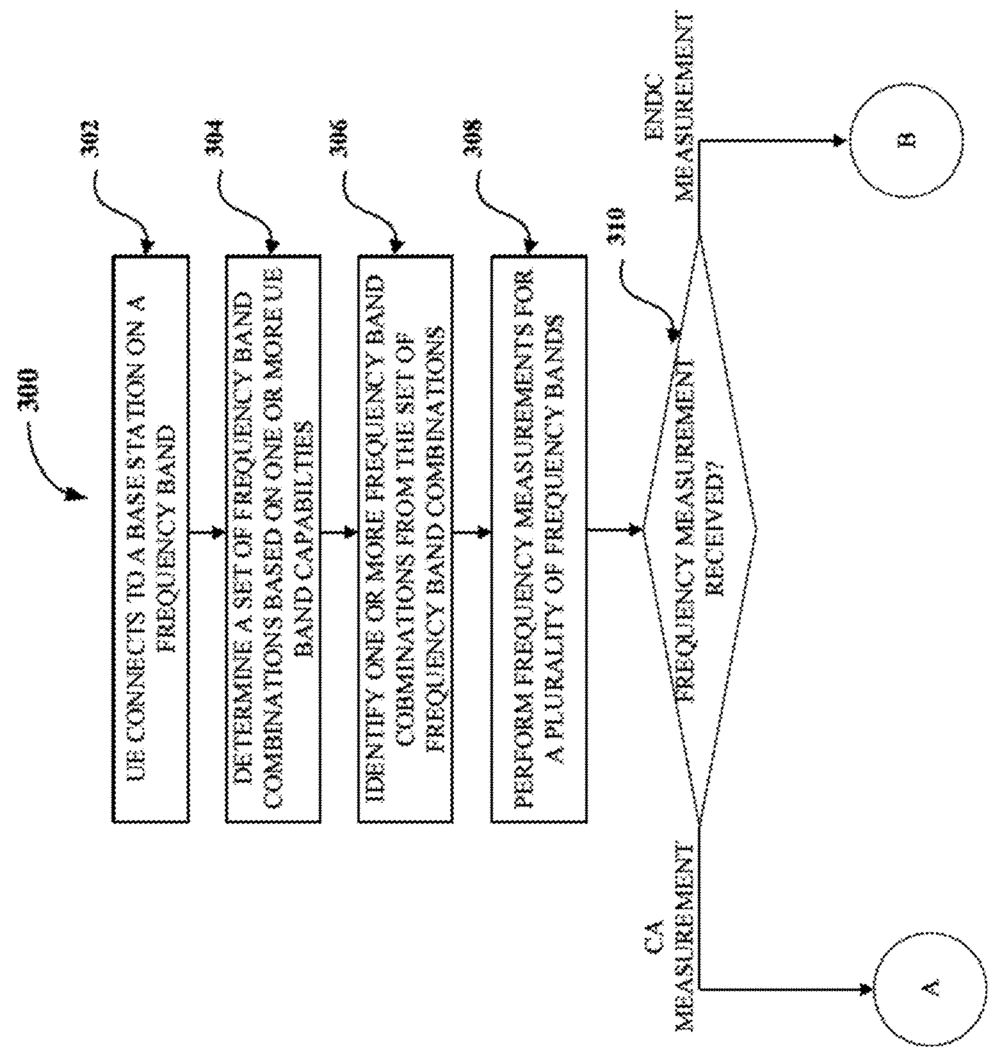
FIGS. 3A, 3B and 3C collectively, illustrate a flowchart of a method for improving user experience in a current cell, in accordance with at least one embodiment.
Figure 3B:
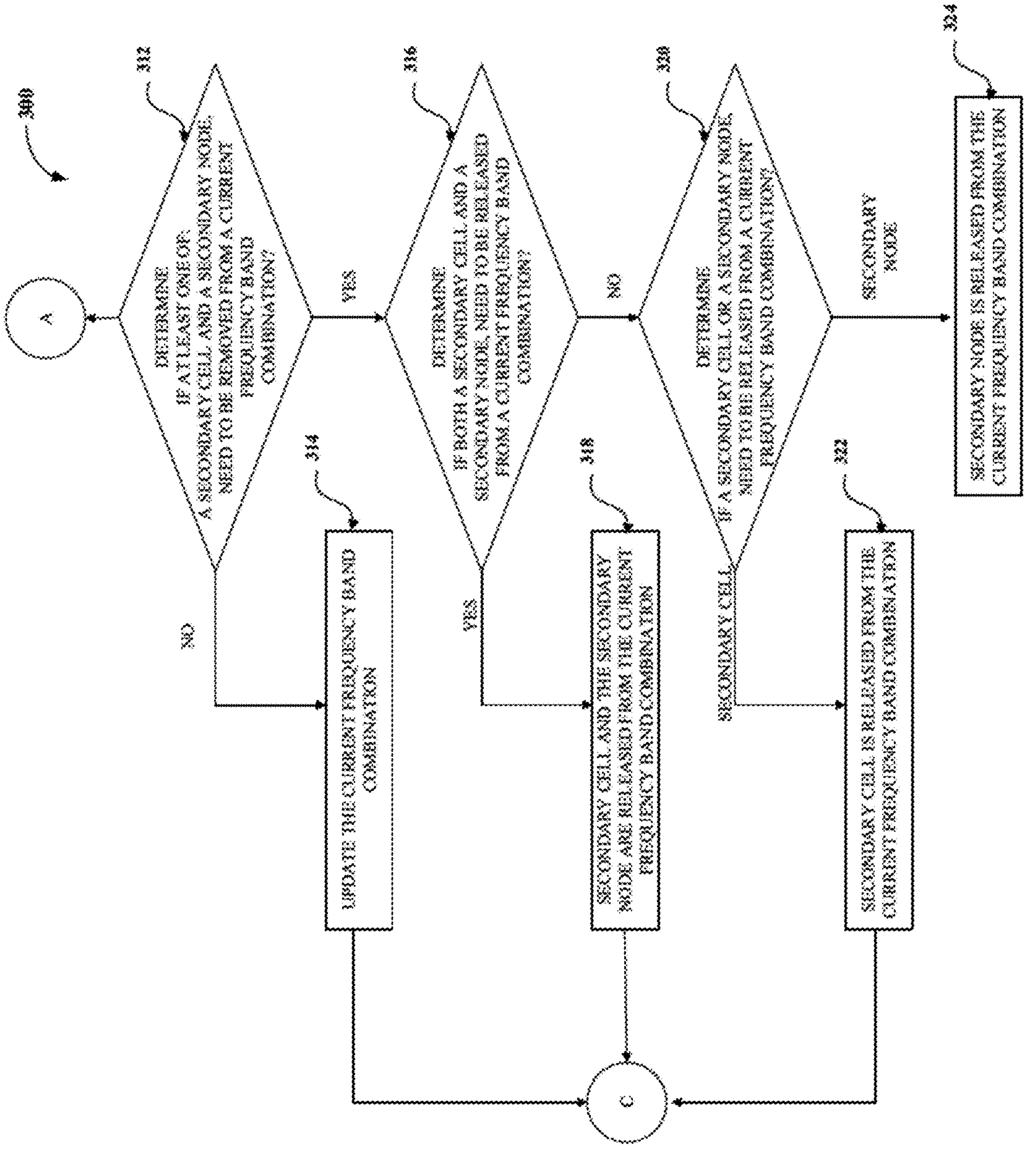
Figure 3C:
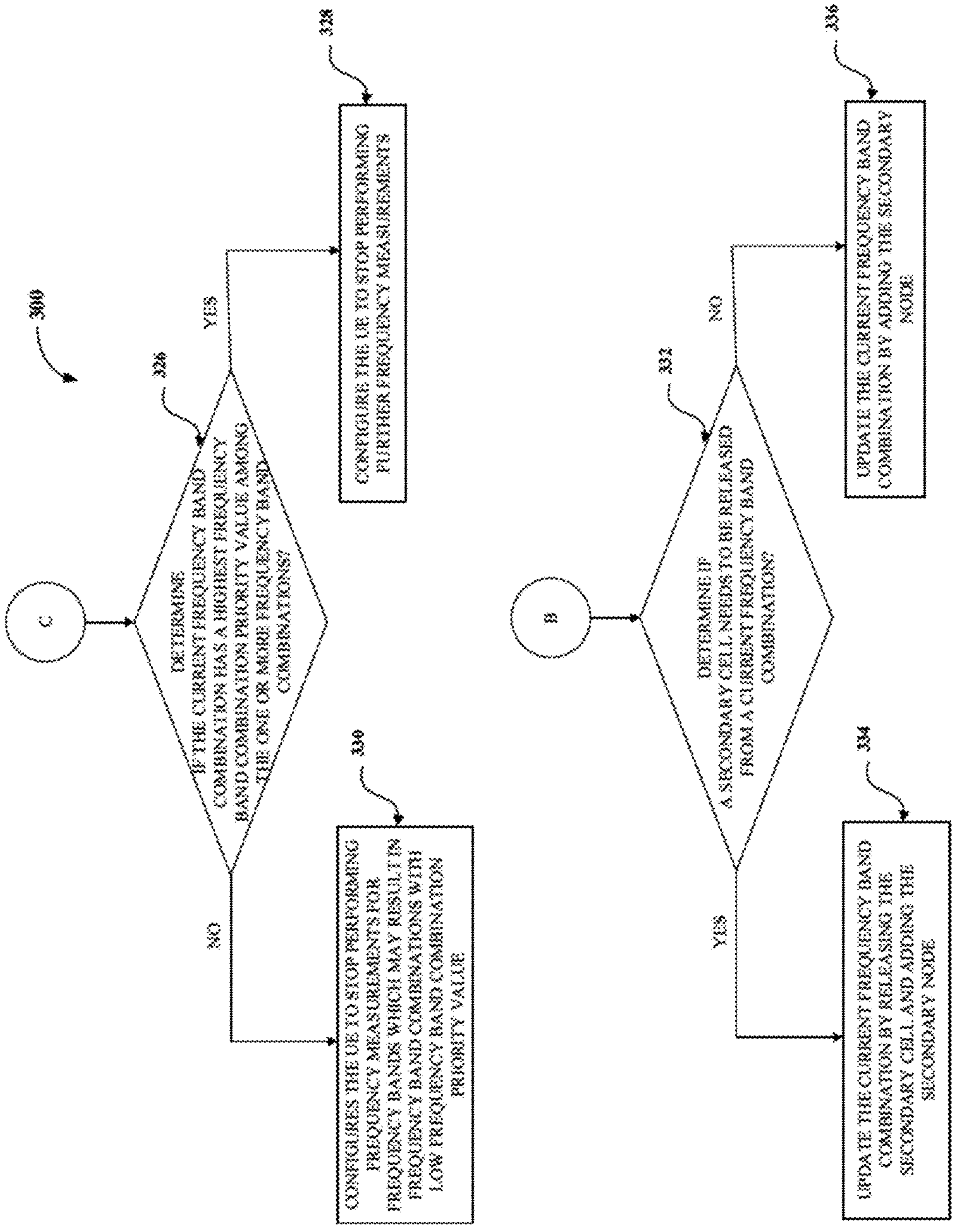

FIGS. 3A-3C collectively, illustrates a flowchart of a method 300 for improving user experience in a current cell, in accordance with at least one embodiment. As already explained, the user experience of the user 104 associated with the UE 102 is improved by dynamically latching to at least one frequency band of the plurality of frequency bands. More specifically, the UE 102 dynamically adds or releases frequency bands in the current cell with the objective of reaching the frequency band combination with the highest frequency band combination priority value. As such, the method 300 is an iterative procedure performed by the system 200 till the UE 102 reaches the frequency band combination with the highest frequency band combination priority value as will be described herein.

At 302, the UE 102 connects to a base station on a frequency band. More specifically, the UE 102 initiates a Protocol Data Unit (PDU) session and as such, attaches to a frequency band. In an example, the UE 102 attaches to the frequency band 1A. In at least one embodiment, the UE 102 sends one or more UE band capabilities in an RRC message to the system 200 during initial registration process. The one or more UE band capabilities include information related to the frequency bands supported by the UE 102.

At 304, a set of frequency band combinations for the UE 102 are determined based on the one or more UE band capabilities.

At 306, one or more frequency band combinations from the set of frequency band combinations are identified based on a current frequency band of the UE 102, and the frequency band combination priority value of each of the set of frequency band combinations.

At 308, the UE 102 is configured to perform frequency measurements for a plurality of frequency bands based on the one or more identified frequency band combinations. More specifically, the group of frequency bands from each of the one or more identified frequency band combinations are collectively referred to as "the plurality of frequency bands." The system 200 configures the UE 102 to perform at least one of: a carrier aggregation measurement and ENDC measurement for each frequency band of the plurality of frequency bands. The UE 102 is not configured to perform frequency measurement for the current frequency band.

At 310, the system 200 receives frequency measurement from at least one frequency band. In response to the system 200 receiving a CA measurement from the UE 102, then a secondary cell corresponding to the frequency measurement needs to be added with the current frequency band and is explained with reference to steps 312-330. In response to the system 200 receiving a ENDC measurement from the UE 102, then a secondary node corresponding to the frequency band is added with the current frequency band and is explained with reference to steps 332-336.

At 312, the system 200 determines whether at least one of: a secondary cell and a secondary node is to be removed from a current frequency band combination $C_{fb}$ to move to a frequency band combination with a higher band combination priority value. In response to neither of a secondary cell nor a secondary node being removed from the current frequency band combination $C_{fb}$ then 314 is performed. Alternatively, in response to either of a secondary cell or a secondary node being removed from the current frequency band combination $C_{fb}$ then 316 is performed.

At 314, the system 200 updates the current frequency band combination $C_{fb}$ for the UE 102. In an example, in response to the current frequency band combination being CA_1A-3A-8A and in response to the UE 102 receiving frequency measurements (i.e., CA measurements) from frequency band 7A, then the system 200 determines that the frequency band combination of CA_1A-3A-7A has a higher frequency band combination priority value of '4' in response to being compared with the frequency band combination is CA_1A-3A-8A with a frequency band combination priority value of '$_5$'. As such, the system 200 determines that a secondary cell (i.e., frequency band 8A) is to be removed and frequency band 7A is to be added to move the UE 102 to the frequency band combination of CA_1A-3A-7A The addition/deletion of one or more secondary cells and/or one or more secondary nodes are determined based on the frequency band combination priority values of the one or more frequency band combinations and one or more policies which are pre-defined and stored in the memory 204 of the system 200. In at least one embodiment, the UE 102 is reconfigured by adding a new secondary cell or a new secondary node from which frequency measurement has been received from the UE 102. Thereafter step 326 is performed.

At 316, the system 200 further determines whether both a secondary cell and a secondary node are released from a current frequency band combination $C_{fb}$. In response to both a secondary cell and a secondary node being released from a current frequency band combination $C_{fb}$, then 318 is performed else 320 is performed.

At 318, the secondary cell and the secondary node are released from the current frequency band combination. More specifically, the current frequency band combination is updated by adding the secondary cell for which the UE 102 received frequency measurements and releasing the secondary cell and secondary node. The releasing of the secondary cell and the secondary node is performed to ensure the UE 102 moves to a frequency band combination with a higher frequency band combination priority value in response to being compared to the frequency band combination priority value of the current frequency band combination. Thereafter, step 326 is performed.

At 320, the system 200 further determines whether a secondary cell or a secondary node is to be released from a current frequency band combination $C_{fb}$. In response to a secondary cell being removed from the current frequency band combination, then 322 is performed and in response to a secondary node being removed then 324 is performed.

At 322, the secondary cell ($S_{cell\_p1}$) is released from the current frequency band combination $C_{fb}$. More specifically, the current frequency band combination is updated by adding a secondary cell (e.g., secondary cell $S_{cell\_c1}$) for which the UE 102 received frequency measurements and releasing the secondary cell ($S_{cell\_p1}$). For example, in response to the current frequency band combination being ($S_{cell\_p1}$, $C_b$, $S_{cell\_p2}$) and in response to frequency measurement of the frequency band corresponding to secondary cell $S_{cell\_c1}$ being received, then the system 200 determines to release $S_{cell\_p1}$ and add $S_{cell\_c1}$ to reach the frequency band combination with highest frequency band combination priority value. The releasing of the secondary cell and the secondary node is performed to ensure the UE 102 moves to a frequency band combination with a higher frequency band combination priority value in response to being compared to the frequency band combination priority value of the current frequency band combination. Thereafter, step 326 is performed.

At 324, the secondary node ($S_{node\_p1}$) is released from the current frequency band combination $C_{fb}$. More specifically, the current frequency band combination is updated by adding a secondary cell (e.g., secondary cell $S_{cell\_c1}$) for which the UE 102 received frequency measurements and releasing the secondary node ($S_{node\_p1}$). Thereafter, step 326 is performed.

At 326, the system 200 determines whether the current frequency band combination has a highest frequency band combination priority value among the one or more frequency band combinations. In response to the current frequency band combination having a highest frequency band combination priority value, then 328 is performed else 330 is performed.

At 328, the system 200 configures the UE 102 to stop performing further frequency measurements. More specifically, the frequency measurements (i.e., at least one of CA measurements and ENDC measurements) of other frequency bands configured by the system 200 previously are removed as the UE 102 has already reached the frequency band combination with highest frequency band combination priority value.

At 330, the system 200 configures the UE 102 to stop performing frequency measurements for frequency bands which result in frequency band combinations with low frequency band combination priority value in response to being compared with the frequency band combination priority value of the current frequency band. The system 200 continues to perform frequency measurements as in step 308 after reconfiguring the UE 102 to perform frequency measurements in 330.

At 332, the system 200 determines whether a secondary cell is to be released from a current frequency band combination $C_{fb}$. In response to a secondary cell being removed from the current frequency band combination, then 334 is performed else 336 is performed.

At 334, the system 200 updates the current frequency band combination $C_{fb}$ for the UE 102. More specifically, the system 200 releases the secondary cell ($S_{cell\_p1}$) from the current frequency band combination $C_{fb}$ and adds the secondary node (e.g., $S_{node\_p1}$) for which the UE 102 received the frequency measurement (i.e., ENDC measurement). Thereafter, step 326 is performed.

At 336, the system 200 updates the current frequency band combination $C_b$ for the UE 102. More specifically, the system 200 adds the secondary node (e.g., $S_{node\_p1}$) for which the UE 102 received the frequency measurement (i.e., ENDC measurement). Thereafter, step 326 is performed.

The frequency measurements of the UE 102 are an iterative procedure and the UE 102 continuously performs frequency measurements till the UE 102 reaches the frequency band combination with highest frequency band combination priority value among the one or more frequency band combinations.

The sequence of operations of the method 300 need not be necessarily executed in the same order as they are presented. Further, one or more operations are grouped together and performed in form of a single step, or one operation is able to have several sub-steps that are performed in parallel or in sequential manner. A method for improving user experience by performing a handover to a different frequency band will be explained next with reference to FIGS. 4A-4B.

Figure 4A:
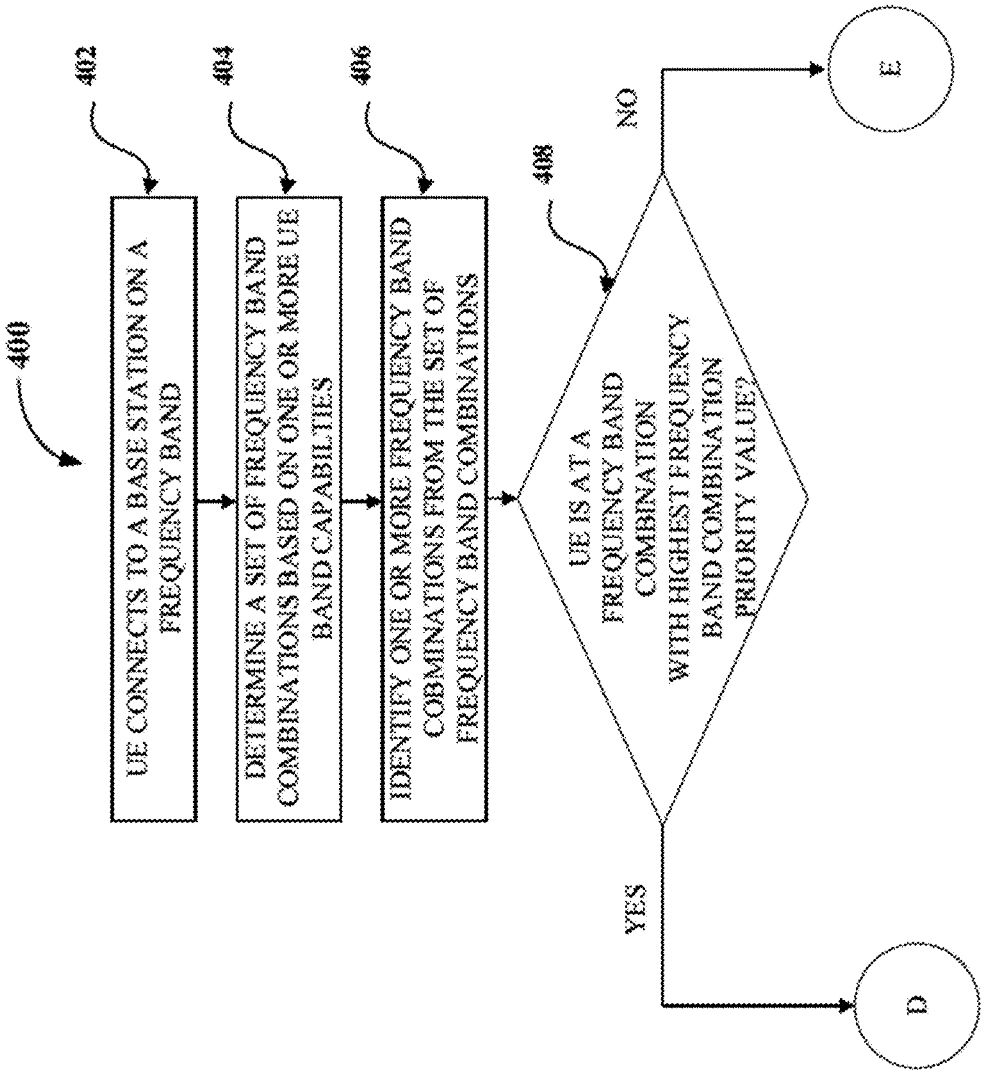
FIGS. 4A and 4B collectively, illustrate a flowchart of a method to perform handover to improve user experience, in accordance with at least one embodiment.
Figure 4B:
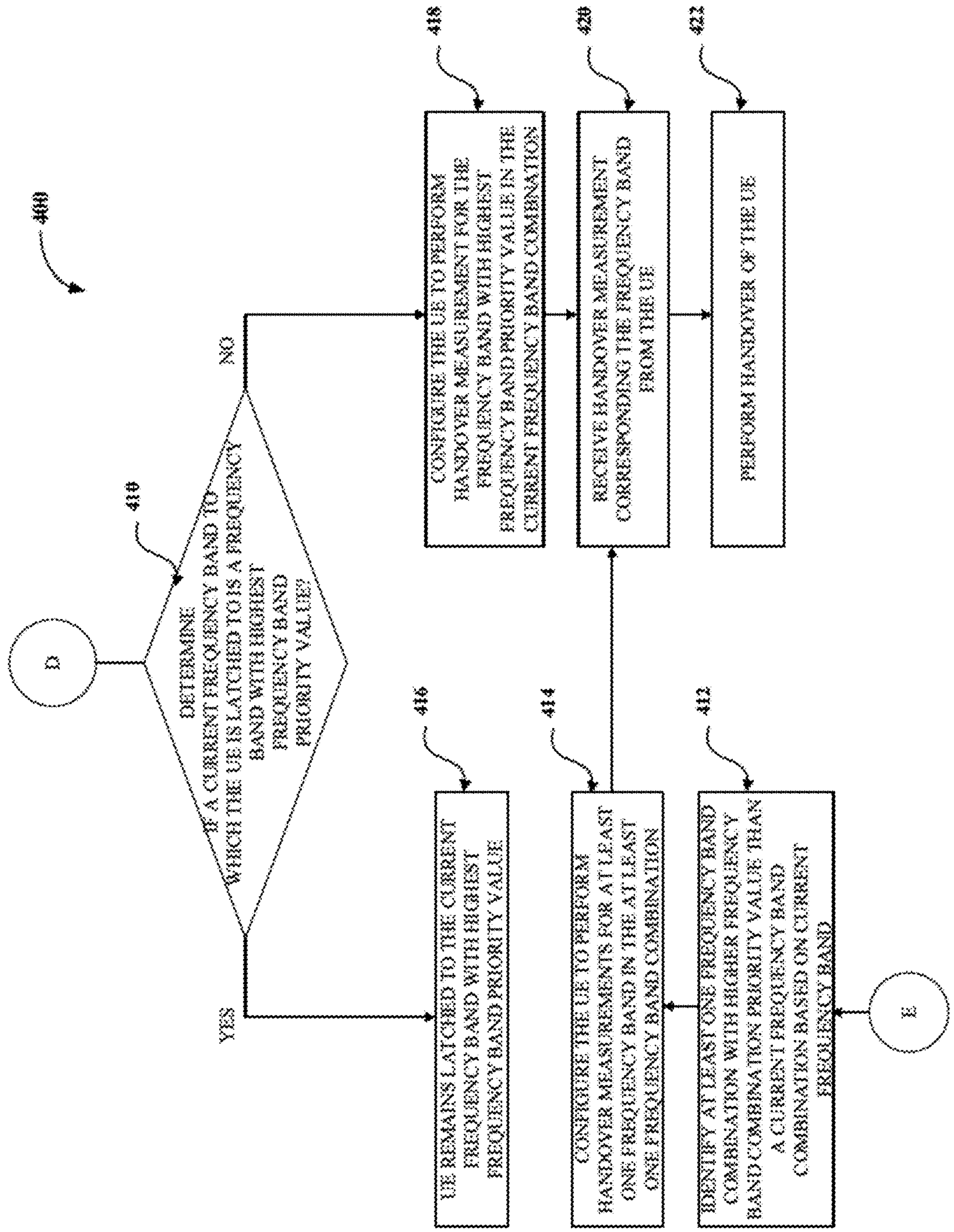

FIGS. 4A-4B collectively illustrates a flowchart of a method 400 to perform handover for improving user experience, in accordance with at least one embodiment. More specifically, the system 200 performs a handover of the UE 102 to a better target cell to further improve the user experience. In response to the frequency band combination with highest frequency band combination priority value not being in a current cell, the system 200 performs handover of the UE 102 to the target cell where frequency band combination with highest frequency band combination priority value is able to occur.

At 402, the UE 102 connects to the base station 110. More specifically, the UE 102 latches to a frequency band in response to connecting to the base station 110. In at least one embodiment, the UE 102 has received one or more idle mode cell reselection priority information as an information element in RRCConnectionRelease message prior to release of the UE 102 from the current frequency band. In at least one embodiment, the UE 102 sends one or more UE band capabilities as part of the RRC setup message. The one or more UE band capabilities includes information related to the frequency bands that are supported by the UE 102.

At 404, a set of frequency band combinations for the UE 102 are determined based on the one or more UE band capabilities. More specifically, the set of frequency band combinations are selected from a plurality of frequency band combinations in the band combination priority table 110 (see, Table 1) based on the one or more UE band capabilities. Each frequency band combination of the set of frequency band combinations comprises: a group of frequency bands, and a frequency band combination priority value for the group of frequency bands. An example of the set of frequency bands selected based on the one or more UE band capabilities is shown in Table 2.

At 406, the system 200 identifies one or more frequency band combinations from the set of frequency band combinations.

At 408, the system 200 determines whether the UE 102 is at a frequency band combination with highest frequency band combination priority value among the set of frequency band combinations. In response to the UE 102 being already latched to the frequency band combination with the highest frequency band combination priority value among the set of frequency band combinations, then step 410 is performed. Alternatively, in response to the UE 102 not being latched to the frequency band combination with the highest frequency band combination priority value among the set of frequency band combinations, step 412 is performed.

At 410, the system 200 determines whether a current frequency band to which the UE 102 is latched to is a frequency band with highest frequency band priority value among a group of frequency bands in the frequency band combination. In response to the current frequency band to which the UE 102 is latched to having the highest frequency band priority value in response to being compared with the group of frequency bands in the frequency band combination, then step 414 is performed else step 416 is performed.

At 412, in response to the UE 102 not being latched to a frequency band combination with highest frequency band combination priority value, then the system 200 is configured to identify at least one frequency band combination with higher frequency band combination priority value than a current frequency band combination which is achieved with the current frequency band. More specifically, the system 200 identifies a frequency band with highest frequency band priority value among the group of frequency bands in the at least one identified frequency band combination.

At 414, the UE 102 is configured to perform handover measurements for at least one frequency band in the at least one identified frequency band combination.

At 416, the UE 102 remains latched to the current frequency band with highest frequency band priority value and no frequency measurements are further performed by the UE 102. In general, the UE 102 is already being provided the best user experience as the UE 102 is latched to the frequency band with highest frequency band priority value in the frequency band combination with highest frequency band combination priority value, for example, band 3A in the frequency band combination DC_3A-7A-7A_n78A (see, Table 2).

At 418, the system 200 configures the UE 102 to perform handover measurement for a frequency band with highest frequency band priority value in the current frequency band combination with highest frequency band combination priority value. As the UE 102 is already latched to the group of frequency bands with highest frequency band combination priority value providing an improved user experience, the user experience of the UE 102 is further improved by performing handover to the frequency band with the highest frequency band combination among the group of frequency bands. In an example, in response to the UE 102 being latched to the frequency band combination of DC_3A-7A-7A_n78A with 7A as a primary cell, the frequency band 7A has a frequency band priority value of '2' in response to being compared with frequency band of '3A' having a frequency band priority value of '1'. Hence, the system 200 configures the UE 102 to perform handover measurement for the frequency band 3A with highest frequency band priority value in the frequency band combination with highest frequency band combination priority value.

At 418, the system 200 receives handover measurement from at least one frequency band.

At 420, the system 200 performs handover of the UE 102 from the current frequency band to another frequency band based on the frequency measurement received from the UE 102. In an example, the system 200 receives the frequency measurement from the UE 102 for the frequency band 3A and as such, performs a handover of the UE 102 from the current frequency band to the frequency band 3A. The handover is not a coverage based handover but a handover to improve the user experience of the UE 102. In an example, the user 102 is viewing a livestreaming content at home and he continues to stay at home while viewing the content, but still the system 200 performs the handover to improve the user experience of the user 104 viewing the livestreaming content. More specifically, the system 200 dynamically facilitates latching of the UE 102 to a different frequency band which provides an improved user experience, for example, enhancement in video quality.

The sequence of operations of the method 450 need not be necessarily executed in the same order as they are presented. Further, one or more operations are grouped together and performed in form of a single step, or one operation have several sub-steps that are performed in parallel or in sequential manner.

Figure 5:
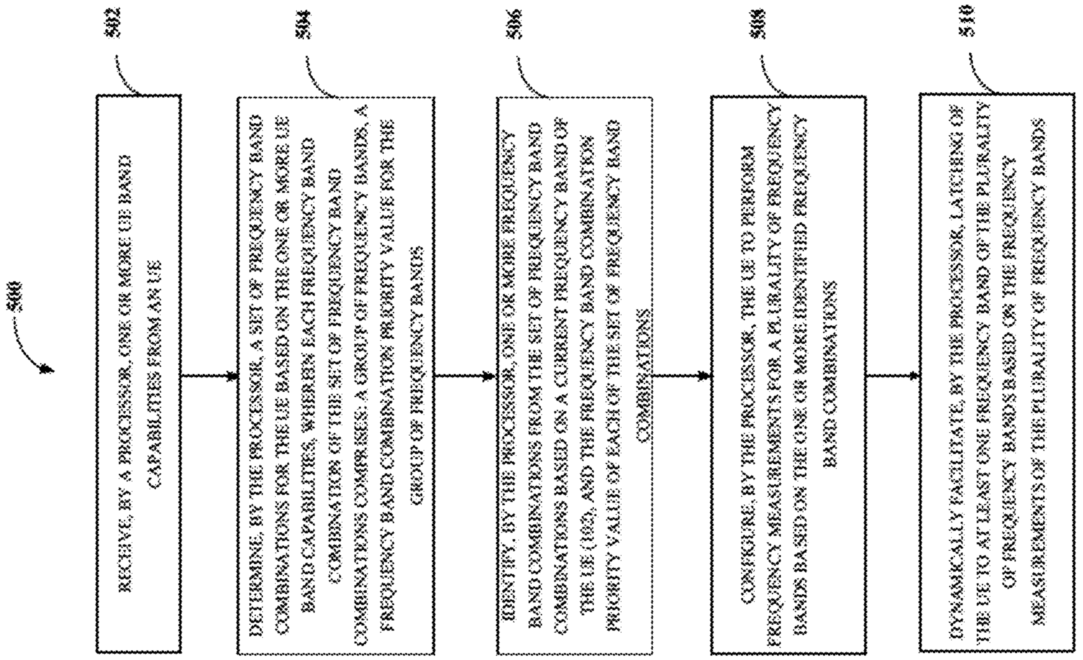
FIG. 5 illustrates a method for improving user experience in multi-frequency layer deployments of 5G communication systems, in accordance with at least one embodiment.

FIG. 5 is a flowchart illustrating a method 500 for improving user experience in multi-frequency layer deployments of 5G communication systems, in accordance with at least one embodiment. The method 500 depicted in the flow diagram is executed by, for example, the system 200 embodied within the base station 110. Operations of the flow diagram, and combinations of operation in the flow diagram, is implemented by, for example, hardware, firmware, a processor, circuitry and/or a different device associated with the execution of software that includes one or more computer program instructions. The operations of the method 500 are described herein with help of the processor 202 embodied within the system 200. The operations of the method 500 is described and/or practiced by using one or more processors of a system or device other than the base station 110, for example, one or more network functions of the 5G core 120 communicably coupled with the base station 110. The method 500 starts at operation 502.

At operation 502 of the method 500, one or more UE band capabilities are received from the UE 102 by a system such as, the system 200 for improving the user experience of the UE 102 availing services of the 5G communication system. In at least one embodiment, the system 200 is embodied within the base station 110 which is eNodeB or a gNodeB. In at least one embodiment, the system 200 is communicable coupled to the base station 110 and configured to perform one or more operations as disclosed in at least one embodiment. As such, the one or more UE band capabilities include information related to the frequency bands supported by the UE 102. The UE 102 sends the one or more UE band capabilities in an RRC message to the system 200 during initial registration process.

At operation 504 of the method 500, a set of frequency band combinations for the UE 102 are determined based on the one or more UE band capabilities. More specifically, the set of frequency band combinations are selected from a plurality of frequency band combinations in the band combination priority table 110 (see, Table 1) based on the one or more UE band capabilities. Each frequency band combination of the set of frequency band combinations comprises: a group of frequency bands, and a frequency band combination priority value for the group of frequency bands. An example of the set of frequency bands selected based on the one or more UE band capabilities is shown in Table 2.

At operation 506 of the method 500, one or more frequency band combinations from the set of frequency band combinations are identified based on a current frequency band of the UE 102, and the frequency band combination priority value of each of the set of frequency band combinations. In general, frequency band combinations with higher frequency band combination priority values in the set of frequency band combinations (as seen in Table 2) that are achieved based on carrier aggregation or dual connectivity with the current frequency band are identified. Determining the one or more frequency band combinations is explained with reference to an example in FIG. 2.

At operation 508 of the method 500, the UE 102 is configured to perform frequency measurements for a plurality of frequency bands based on the one or more identified frequency band combinations. More specifically, the group of frequency bands from the one or more identified frequency band combinations are referred to as "the plurality of frequency bands." The system 200 configures the UE 102 to perform at least one of: a carrier aggregation measurement and ENDC measurement for each frequency band of the plurality of frequency bands. Further, the UE 102 is also configured to identify the at least one frequency band from the plurality of frequency bands with a higher frequency band priority value with respect to the current frequency band based on the frequency band combination priority value associated with each of the one or more identified frequency band combinations and a frequency band priority value associated with each frequency band of the plurality of frequency bands. Thereafter, the processor 202 of the system 200 configures the UE 102 to perform handover measurements for the at least one frequency band.

At operation 510 of the method 500, the UE 102 is dynamically facilitated to latch to at least one frequency band of the plurality of frequency bands based on the frequency measurements of the plurality of frequency bands. The system 200 receives frequency measurement of the at least one frequency band from the UE 102. As already explained, the frequency measurement is one of: carrier aggregation measurement, ENDC measurement and handover measurement. The system 200 facilitates the UE 102 to perform a secondary cell addition to the current frequency band in response to carrier aggregation measurement of a frequency band being received from the UE 102 and a secondary node addition to the current frequency band in response to ENDC measurement of a frequency band being received from the UE 102. The system 200 dynamically decides to add or delete frequency bands on receiving frequency measurement from the UE 102 to provide the best user experience for the UE 102 by dynamically latching to frequency bands which would ensure the UE 102 latches to frequency band combination with higher priority value than a current frequency band combination or latches to a frequency band with higher frequency band priority value in response to being compared to the current frequency band. In general, the system 200 performs a handover of the UE 102 from the current frequency band to the at least one frequency band in response to the system 200 receiving handover measurements for the at least one frequency band. An example of dynamically latching to the at least one frequency band is explained in detail with reference to FIG. 2.

The sequence of operations of the method 500 need not be necessarily executed in the same order as they are presented. Further, one or more operations are grouped together and performed in form of a single step, or one operation have several sub-steps that are performed in parallel or in sequential manner.

The disclosed method with reference to FIGS. 3A-3C, 4A-4B and 5, or one or more operations of the system 200 are explained with reference to FIGS. 2-5 and is implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software is executed, for example, on a single local computer.

Furthermore, one or more computer-readable storage media is utilized in implementing at least one embodiment. A computer-readable storage medium refers to any type of physical memory on which information or data readable by a processor is stored. Thus, a computer-readable storage medium stores instructions for execution by one or more processors, including instructions for causing the processor(s) to perform steps or stages consistent with embodiments described herein. The term "computer-readable medium" is understood to include tangible items and exclude carrier waves and transient signals, i.e., be non-transitory. Examples include Random Access Memory (RAM), Read-Only Memory (ROM), volatile memory, non-volatile memory, hard drives, CD (Compact Disc) ROMs, DVDs, flash drives, disks, and any other known physical storage media.

Claimable Aspects

An aspect of at least one embodiment is directed to a system [1] for dynamically facilitating latching of an User Equipment (UE) includes a memory storing computer-readable instructions, and a processor, connected to the memory, wherein the processor is configured to execute the computer-readable instructions to perform operations to receive one or more UE band capabilities from a UE, determine a set of frequency band combinations for the UE based on the one or more UE band capabilities, wherein each frequency band combination of the set of frequency band combinations includes a group of frequency bands, and a frequency band combination priority value for the group of frequency bands, identify one or more frequency band combinations from the set of frequency band combinations based on and a current frequency band of the UE and the frequency band combination priority value of each of the set of frequency band combinations, configure the UE to perform frequency measurements for a plurality of frequency bands based on the one or more identified frequency band combinations, and dynamically facilitate latching of the UE to at least one frequency band of the plurality of frequency bands based on the frequency measurements of the plurality of frequency bands.

The system described in [1], wherein the processor is further configured to identify one or more frequency band combinations from the set of frequency band combinations by: identifying the at least one frequency band from the plurality of frequency bands based on a frequency band priority value associated with each of the plurality of frequency bands, wherein the plurality of frequency bands are associated with the one or more identified frequency band combinations.

The system described in any one of [1] or [2], wherein each of the one or identified more frequency band combinations have at least one frequency band with a higher frequency band priority value than the current frequency band.

The system described in any of [1] to [3], wherein the processor is further configured to: determine one or more frequency bands from the plurality of frequency bands based on a frequency band priority value associated with each of the plurality of frequency bands, generate an idle mode cell reselection priority information comprising the one or more frequency bands and corresponding frequency band priority values, and send the one or more idle mode cell reselection priority information to the UE prior to release from the current frequency band.

The system described in any of [1] to [4], wherein the one or more idle mode cell reselection priority information is an information element in the RRCConnectionRelease message.

The system described in any of [1] to [5], wherein the processor is configured to configure the UE to perform frequency measurements for a plurality of frequency bands by configuring the UE to perform at least one of: a carrier aggregation measurement and E-UTRAN New Radio—Dual Connectivity (ENDC) measurement for each frequency band of the plurality of frequency bands.

The system described in any of [1] to [6], wherein the processor is further configured to receive frequency measurement of the at least one frequency band from the UE, and facilitate the UE to perform one of: a secondary cell addition, and a secondary node addition, of the at least one frequency band with the current frequency band.

The system described in any of [1] to [7], wherein the processor is configured to configure the UE to perform frequency measurements for a plurality of frequency bands by identifying the at least one frequency band from the plurality of frequency bands with a higher frequency band priority value with respect to the current frequency band based on the frequency band combination priority value associated with each of the one or more identified frequency band combinations and a frequency band priority value associated with each frequency band of the plurality of frequency bands, wherein the plurality of frequency bands are associated with the one or more identified frequency band combinations, and configuring the UE to perform handover measurements for the at least one frequency band.

The system described in any of [1] to [8], wherein the processor is further configured to receive frequency measurement of the at least one frequency band, and perform a handover of the UE from the current frequency band to the at least one frequency band.

The system described in any of [1] to [9], wherein the frequency band combination priority value of the group of frequency bands and a frequency band priority value for each frequency band are determined based on throughput, and bandwidth.

An aspect of at least one embodiment is directed to a method [11] for dynamically facilitating latching of an User Equipment (UE) includes receiving, by a processor, one or more UE band capabilities from a UE, determining, by the processor, a set of frequency band combinations for the UE based on the one or more UE band capabilities, wherein each frequency band combination of the set of frequency band combinations includes: a group of frequency bands, and a frequency band combination priority value for the group of frequency bands, identifying, by the processor, one or more frequency band combinations from the set of frequency band combinations based on a current frequency band of the UE, and the frequency band combination priority value of each of the set of frequency band combinations, configuring, by the processor, the UE to perform frequency measurements for a plurality of frequency bands based on the one or more identified frequency band combinations, and dynamically facilitate, by the processor, latching of the UE to at least one frequency band of the plurality of frequency bands based on the frequency measurements of the plurality of frequency bands.

The method described in [11], wherein the identifying the one or more frequency band combinations further includes identifying, by the processor, the at least one frequency band from the plurality of frequency bands based on a frequency band priority value associated with each of the plurality of frequency bands, wherein the plurality of frequency bands are associated with the one or more identified frequency band combinations.

The method described in any one of [11] to [12], wherein the identifying the one or more frequency band combinations further includes identifying each of the one or identified more frequency band combinations have at least one frequency band with a higher frequency band priority value than the current frequency band.

The method described in any one of [11] to [13] further comprising determining, by the processor, one or more frequency bands from the plurality of frequency bands based on a frequency band priority value associated with each of the plurality of frequency bands, generating, by the processor, an idle mode cell reselection priority information including the one or more frequency bands and corresponding frequency band priority values, and sending, by the processor, the one or more idle mode cell reselection priority information to the UE prior to release from the current frequency band.

The method described in any one of [11] to [14], wherein the generating the idle mode cell reselection priority information includes generating one or more idle mode cell reselection priority information having an information element in the RRCConnectionRelease message.

The method described in any one of [11] to [15], wherein the configuring the UE (102) to perform frequency measurements includes configuring the UE (102) to perform at least one of: a carrier aggregation measurement and E-UTRAN New Radio—Dual Connectivity (ENDC) measurement for each frequency band of the plurality of frequency bands.

The method described in any one of [11] to [16] further comprising receiving frequency measurement of the at least one frequency band from the UE, and facilitating the UE to perform one of: secondary cell addition, and secondary node addition, of the at least one frequency band with the current frequency band.

The method described in any one of [11] to [17], wherein the configuring the UE to perform frequency measurements includes: identifying the at least one frequency band from the plurality of frequency bands with a higher frequency band priority value with respect to the current frequency band based on the frequency band combination priority value associated with each of the one or more identified frequency band combinations and a frequency band priority value associated with each of the plurality of frequency bands, wherein the plurality of frequency bands are associated with the one or more identified frequency band combinations, and configuring the UE to perform handover measurements for the at least one frequency band.

The method described in any one of [11] to [18]further comprising receiving frequency measurement of the at least one frequency band, and performing a handover of the UE from the current frequency band to the at least one frequency band.

An aspect of at least one embodiment is directed to a non-transitory computer-readable medium storing instructions thereon [20], which when executed by a system causes the system to perform operations including receiving one or more UE band capabilities from a UE, determining a set of frequency band combinations for the UE based on the one or more UE band capabilities. Each frequency band combination of the set of frequency band combinations includes: a group of frequency bands, and a frequency band combination priority value for the group of frequency bands, identifying one or more frequency band combinations from the set of frequency band combinations based on a current frequency band of the UE, and the frequency band combination priority value of each of the set of frequency band combinations, configuring the UE to perform frequency measurements for a plurality of frequency bands based on the one or more identified frequency band combinations, and dynamically facilitate latching of the UE to at least one frequency band of the plurality of frequency bands based on the frequency measurements of the plurality of frequency bands.

Various embodiments described herein provide numerous advantages. In general, the band combination priority table gives flexibility to the mobile network operator to configure band combination priorities as per their deployment strategies resulting in improvement of overall user experience for UEs. Embodiments described herein enable improving the user experience in current cell. More specifically, the UE is facilitated to add or release secondary cells and/or secondary nodes to have a frequency band combination with highest frequency band combination priority value, thereby improving user experience in the current cell. Further, the system also performs a handover of the UE to a better target cell to further improve the experience. Moreover, dedicated idle mode cell reselection priorities are set to ensure the UE camps onto right cell where the UE has a better user experience during next attach. Improving the user experience ensures a seamless experience for the user of the UE in the 5G communication system. The technical effect of improving the user experience ensures providing higher downlink and uplink data rates, better voice experience, conservation of UE battery, avoiding frequent handovers, etc. This in turn translates into ability to serve maximum number of UEs while meeting desired service experience. Furthermore, improving user experience based on the frequency band combination table and more specifically, the frequency band combination increases the total available bandwidth of a single transmission, and thereby increase the bitrate and capacity of the network.

Those skilled in the art that, in general, understand terms used herein, and are generally intended as “open” terms (e.g., the term “including” is interpreted as “including but not limited to,” the term “having” is interpreted as “having at least,” the term “includes” is interpreted as “includes but is not limited to,” etc.). For example, as an aid to understanding, the detail description includes usage of the introductory phrases “at least one” and “one or more” to introduce recitations. However, the use of such phrases are not to be construed to imply that the introduction of a recitation by the indefinite articles "a" or "an" limits any particular part of description containing such introduced recitation to embodiments containing only one such recitation, even in response to the introductory phrases "one or more" or "at least one" and indefinite articles such as "a" or "an" (e.g., "a" and/or "an" typically are interpreted to mean "at least one" or "one or more") being included in the recitations; the same holds true for the use of definite articles used to introduce such recitations. In addition, even in response to a specific part of the introduced description recitation being explicitly recited, those skilled in the art will recognize that such recitation typically are interpreted to mean at least the recited number (e.g., the bare recitation of "two recitations," without other modifiers, typically means at least two recitations or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following detailed description.

We claim:

1. A system for improving user experience in multi-frequency layer deployments, wherein the system is configured to:

receive one or more User Equipment (UE) band capabilities from a UE;

determine a set of frequency band combinations for the UE based on the one or more UE band capabilities, wherein each frequency band combination of the set of frequency band combinations includes a group of frequency bands, a frequency band combination priority value for each of the frequency band combinations, and a frequency band priority value for each frequency band in the set of frequency band combinations;

identify one or more frequency band combinations from the set of frequency band combinations based on a current frequency band of the UE and the frequency band combination priority value of each of the set of frequency band combinations;

configure the UE to perform frequency measurements for a plurality of frequency bands in the set of frequency band combinations based on the one or more identified frequency band combinations; and dynamically facilitate latching of the UE to at least one frequency band of the plurality of frequency bands having a higher frequency band priority value based on the frequency measurements of the plurality of frequency bands.

2. The system as claimed in claim 1, wherein the system is further configured to identify one or more frequency band combinations from the set of frequency band combinations by:

identifying the at least one frequency band from the plurality of frequency bands based on the frequency band priority value associated with each of the plurality of frequency bands, wherein the plurality of frequency bands are associated with the one or more identified frequency band combinations.

3. The system as claimed in claim 1, wherein the system is further configured to:

determine one or more frequency bands from the plurality of frequency bands based on the frequency band priority value associated with each of the plurality of frequency bands;

generate an idle mode cell reselection priority information including the one or more frequency bands and corresponding frequency band priority values; and send the one or more idle mode cell reselection priority information to the UE prior to release from the current frequency band.

4. The system as claimed in claim 3, wherein the one or more idle mode cell reselection priority information is an information element in a RRCConnectionRelease message.

5. The system as claimed in claim 1, wherein the system is configured to configure the UE to perform frequency measurements for a plurality of frequency bands by:

configuring the UE to perform at least one of: a carrier aggregation measurement and E-UTRAN New Radio—Dual Connectivity (ENDC) measurement for each frequency band of the plurality of frequency bands.

6. The system as claimed in claim 5, wherein the system is further configured to:

receive a frequency measurement of the at least one frequency band from the UE; and facilitate the UE to perform one of: a secondary cell addition, and a secondary node addition, of the at least one frequency band with the current frequency band.

7. The system as claimed in claim 1, wherein the system is configured to configure the UE to perform frequency measurements for a plurality of frequency bands by:

identifying the at least one frequency band from the plurality of frequency bands with the higher frequency band priority value with respect to the current frequency band based on the frequency band combination priority value associated with each of the one or more identified frequency band combinations and the frequency band priority value associated with each frequency band of the plurality of frequency bands, wherein the plurality of frequency bands are associated with the one or more identified frequency band combinations; and configuring the UE to perform handover measurements for the at least one frequency band.

8. The system as claimed in claim 7, wherein the system is further configured to:

receive a frequency measurement of the at least one frequency band; and perform a handover of the UE from the current frequency band to the at least one frequency band.

9. The system as claimed in claim 1, wherein the frequency band combination priority value of the group of frequency bands and the frequency band priority value for each frequency band are determined based on throughput, and bandwidth.

10. A method, comprising:

receiving, by a processor, one or more User Equipment (UE) band capabilities from a UE;

determining, by the processor, a set of frequency band combinations for the UE based on the one or more UE band capabilities, wherein each frequency band combination of the set of frequency band combinations includes: a group of frequency bands, a frequency band combination priority value for each of the frequency band combinations, and a frequency band priority value for each frequency band in the set of frequency band combinations;

identifying, by the processor, one or more frequency band combinations from the set of frequency band combinations based on a current frequency band of the UE, and the frequency band combination priority value of each of the set of frequency band combinations;

configuring, by the processor, the UE to perform frequency measurements for a plurality of frequency bands in the set of frequency band combinations based on the one or more identified frequency band combinations; and dynamically facilitate, by the processor, latching of the UE to at least one frequency band of the plurality of frequency bands having a higher frequency band priority value based on the frequency measurements of the plurality of frequency bands.

11. The method as claimed in claim 10, wherein the identifying the one or more frequency band combinations further includes:

identifying, by the processor, the at least one frequency band from the plurality of frequency bands based on the frequency band priority value associated with each of the plurality of frequency bands, wherein the plurality of frequency bands are associated with the one or more identified frequency band combinations.

12. The method as claimed in claim 10, further comprising:

determining, by the processor, one or more frequency bands from the plurality of frequency bands based on the frequency band priority value associated with each of the plurality of frequency bands;

generating, by the processor, an idle mode cell reselection priority information including the one or more frequency bands and corresponding frequency band priority values; and sending, by the processor, the one or more idle mode cell reselection priority information to the UE prior to release from the current frequency band.

13. The method as claimed in claim 12, wherein the generating the idle mode cell reselection priority information includes generating one or more idle mode cell reselection priority information having an information element in a RRCConnectionRelease message.

14. The method as claimed in claim 10, wherein the configuring the UE to perform frequency measurements includes:

configuring the UE to perform at least one of: a carrier aggregation measurement and E-UTRAN New Radio—Dual Connectivity (ENDC) measurement for each frequency band of the plurality of frequency bands.

15. The method as claimed in claim 14, further comprising:

receiving a frequency measurement of the at least one frequency band from the UE; and facilitating the UE to perform one of: secondary cell addition, and secondary node addition, of the at least one frequency band with the current frequency band.

16. The method as claimed in claim 15, wherein the configuring the UE to perform frequency measurements includes:

identifying the at least one frequency band from the plurality of frequency bands with the higher frequency band priority value with respect to the current frequency band based on the frequency band combination priority value associated with each of the one or more identified frequency band combinations and the frequency band priority value associated with each of the plurality of frequency bands, wherein the plurality of frequency bands are associated with the one or more identified frequency band combinations; and configuring the UE to perform handover measurements for the at least one frequency band.

17. The method as claimed in claim 16, further comprising:

receiving a frequency measurement of the at least one frequency band; and performing a handover of the UE from the current frequency band to the at least one frequency band.

18. A non-transitory computer-readable medium storing computer-readable instructions thereon, which when executed by a system causes the system to perform operations comprising:

receiving one or more User Equipment (UE) band capabilities from a UE;

determining a set of frequency band combinations for the UE based on the one or more UE band capabilities, wherein each frequency band combination of the set of frequency band combinations includes a group of frequency bands, a frequency band combination priority value for each of the frequency band combinations, and a frequency band priority value for each frequency band in the set of frequency band combinations;

identifying one or more frequency band combinations from the set of frequency band combinations based on a current frequency band of the UE, and the frequency band combination priority value of each of the set of frequency band combinations;

configuring the UE to perform frequency measurements for a plurality of frequency bands in the set of frequency band combinations based on the one or more identified frequency band combinations; and dynamically facilitate latching of the UE to at least one frequency band of the plurality of frequency bands having a higher frequency band priority value based on the frequency measurements of the plurality of frequency bands.

* * * * *